(12) United States Patent
Galloway et al.

(10) Patent No.: US 11,642,641 B2
(45) Date of Patent: May 9, 2023

(54) COMPACT AND MAINTAINABLE WASTE REFORMATION APPARATUS

(71) Applicant: Raven SR, Inc., Pinedale, WY (US)

(72) Inventors: Terry R. Galloway, Berkeley, CA (US); Joseph Oscar Waidl, Pacheco, CA (US)

(73) Assignee: Raven SR, Inc., Pinedale, WY (US)

( * ) Notice: Subject to any disclaimer, the term of this patent is extended or adjusted under 35 U.S.C. 154(b) by 0 days.

(21) Appl. No.: 17/521,956

(22) Filed: Nov. 9, 2021

(65) Prior Publication Data

US 2022/0062846 A1 Mar. 3, 2022

Related U.S. Application Data

(63) Continuation of application No. 16/918,058, filed on Jul. 1, 2020, now Pat. No. 11,179,693, which is a
(Continued)

(51) Int. Cl.
| | |
|---|---|
| *B01J 12/00* | (2006.01) |
| *C10B 1/10* | (2006.01) |
| *B01J 8/06* | (2006.01) |
| *B01J 19/24* | (2006.01) |
| *B01J 19/28* | (2006.01) |
| *C10G 2/00* | (2006.01) |
| *C10B 19/00* | (2006.01) |
| *C10B 39/06* | (2006.01) |

(Continued)

(52) U.S. Cl.
CPC ............. *B01J 12/007* (2013.01); *B01J 8/067* (2013.01); *B01J 19/248* (2013.01); *B01J 19/2425* (2013.01); *B01J 19/28* (2013.01); *C10B 1/10* (2013.01); *C10B 7/00* (2013.01); *C10B 19/00* (2013.01); *C10B 21/04* (2013.01); *C10B 25/02* (2013.01); *C10B 39/06* (2013.01); *C10G 2/32* (2013.01); *B01J 2219/00078* (2013.01); *B01J 2219/00135* (2013.01); *B01J 2219/00768* (2013.01); *B01J 2219/00772* (2013.01); *B01J 2219/00777* (2013.01); *B01J 2219/1946* (2013.01); *Y02P 20/129* (2015.11)

(58) Field of Classification Search
CPC . B01J 12/007; B01J 19/28; B01J 8/067; B01J 19/425; B01J 19/248; B01J 19/1946; C10G 2/32; C01B 1/10
See application file for complete search history.

(56) References Cited

U.S. PATENT DOCUMENTS

| | | | | |
|---|---|---|---|---|
| 2010/0240780 | A1* | 9/2010 | Holcombe | B01J 12/007 |
| | | | | 518/712 |
| 2014/0246183 | A1* | 9/2014 | Loebig | F28D 9/02 |
| | | | | 29/890.039 |

\* cited by examiner

*Primary Examiner* — Jafar F Parsa
(74) *Attorney, Agent, or Firm* — Dentons Bingham Greenebaum LLP; Brian W. Chellgren; John V. Daniluck

(57) ABSTRACT

Methods and apparatus for compact and easily maintainable waste reformation. Some embodiments include a rotary oven reformer adapted and configured to provide synthesis gas from organic waste. Some embodiments include a rotary oven with simplified operation both as to reformation of the waste, usage of the synthesized gas and other products, and easy removal of the finished waste products, preferably in a unit of compact size for use in austere settings. Yet other embodiments include Fischer-Tropsch reactors of synthesized gas. Some of these reactors include heat exchanging assemblies that provide self-cleaning effects, efficient utilization of waste heat, and ease of cleaning.

11 Claims, 13 Drawing Sheets

Related U.S. Application Data continuation of application No. 15/514,041, filed as application No. PCT/US2015/051962 on Sep. 24, 2015, now Pat. No. 10,710,043.

(60) Provisional application No. 62/174,823, filed on Jun. 12, 2015, provisional application No. 62/054,524, filed on Sep. 24, 2014.

(51) Int. Cl.
*C10B 7/00* (2006.01)
*C10B 21/04* (2006.01)
*C10B 25/02* (2006.01)

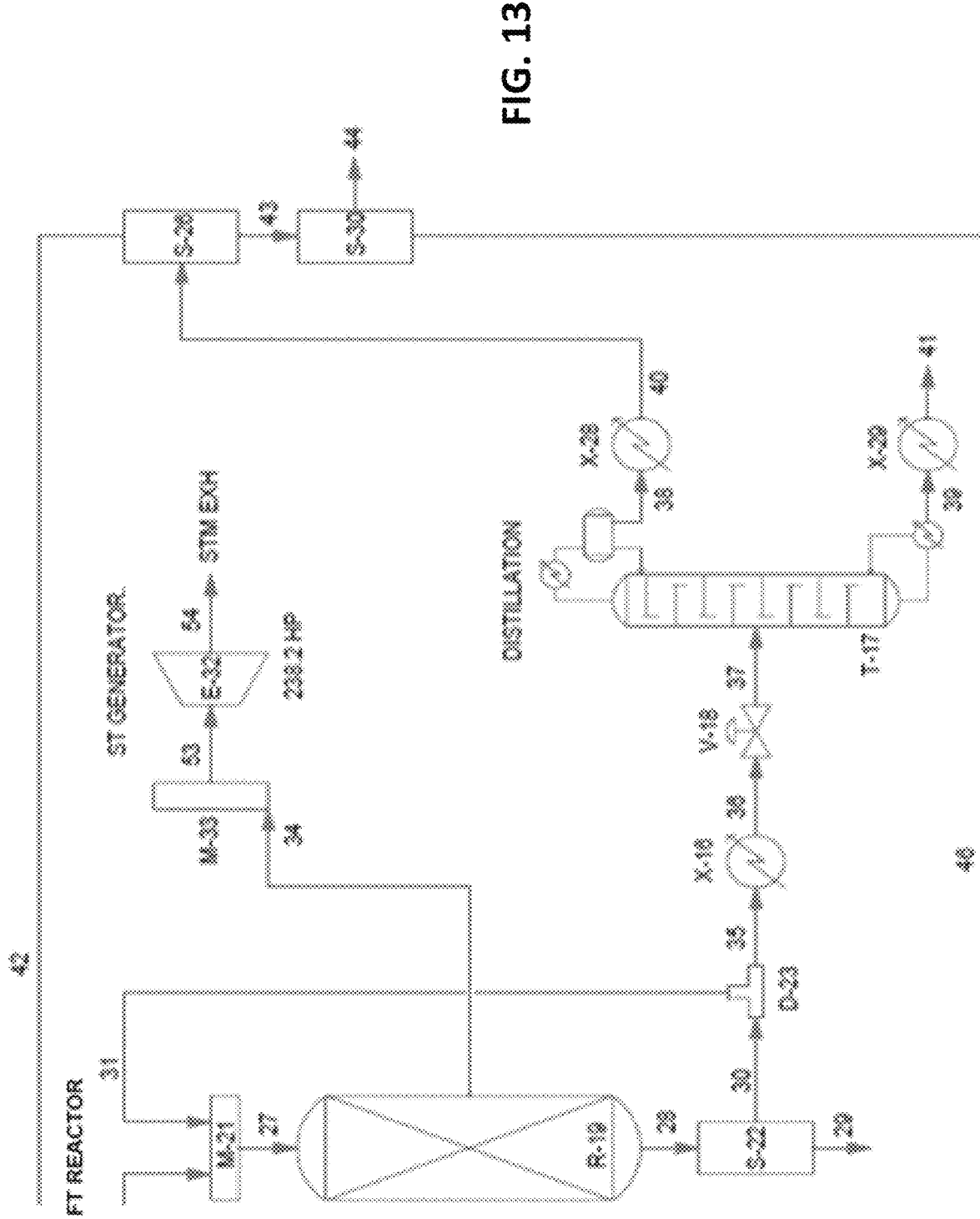

COMPACT AND MAINTAINABLE WASTE REFORMATION APPARATUS

CROSS REFERENCE TO RELATED APPLICATIONS

This application claims the benefit of priority as a continuation of U.S. patent application Ser. No. 16/918,058, filed Jul. 1, 2020, which claims the benefit of priority as a continuation of U.S. patent application Ser. No. 15/514,041, filed Mar. 27, 2017, which claims the benefit of priority as a 371 filing of International Application No. PCT/US2015/051962, filed Sep. 24, 2015, entitled COMPACT AND MAINTAINABLE WASTE REFORMATION APPARATUS, which claims the benefit of priority to U.S. Provisional Patent Application Ser. No. 62/054,524, filed Sep. 24, 2014, entitled ROTARY OVEN REFORMER, and U.S. Provisional Patent Application Ser. No. 62/174,823, filed Jun. 12, 2015, entitled IMPROVED FISCHER-TROPSCH REACTOR, all of which are incorporated herein by reference.

FIELD OF THE INVENTION

Various embodiments pertain to systems for converting waste to fuel and/or energy, and in particular to such systems that are of compact size for operation at remote locations, and in particular to other such systems that produce Fischer-Tropsch products with reactors that are easily maintained.

BACKGROUND OF THE INVENTION

There is an urgent need at military-forward operating bases (FOB) for both: (a) disposal of waste; and (b) generation of electricity. Currently, the waste produced from operations, supply depots, commissaries, cafeterias, medical facilities, etc is being simply burned in open pits. This practice exposes the troops and military support personnel to toxics, pathogens, etc., provides a very clear infra-red signature, and leaves environmental problem trails. Hauling the waste out from the FOBs with long truck convoys exposes troops and truck operators to being attacked. The record here is horrible with more personnel being lost in the waste hauling operations than at the front lines. Also hauling in fuel to run generators to recharge the myriad of batteries used for the advanced instrumentation and communications assets has a similar convoy death record.

Domestically, there are problems from waste disposal as well in underdeveloped regions, stressed urban areas, and very remote areas of oil and gas exploration and production operations, medical facilities, emergency cleanup, etc. as well.

What is needed is a small portable module that can be air dropped or trucked in that will use these waste streams to produce electric power. Various embodiments of the present invention address these needs.

The synthetic production of hydrocarbons by the catalytic reaction of carbon monoxide and hydrogen is well known and generally referred to as the Fischer-Tropsch (FT) reaction. The FT process was developed in the early 1920's in Germany. It has been commercial since World War II, particularly in South Africa. The FT reaction benefits from a catalyst to convert the carbon monoxide (CO) and hydrogen ($H_2$) to a range of paraffinic hydrocarbons from 1 to 100 carbons.

Numerous types of reactor systems have been used for carrying out FT synthesis ranging from fixed bed three phase bubble column designs, fluidized bed, ebullating beds, and fixed plate heat exchangers. These various designs may encounter high expense due to large amounts of catalyst used from inefficient contact with the catalyst surface, and ineffective cooling.

Fixed bed reactors of individual catalyst particles ae packed into tubes arranged in a cylindrical vessel. The individual particles can involve various shapes of spheres, cylinders, saddles, and rings with void volume fractions from 0.3 the 0.5. Although these packed bed reactors are simple and can be scaled up, they encounter high heat release requirements with the tube size being small with high pressure drop. Also, these narrow tubes are difficult to clean and maintain.

The manufacture of finned tubes for heat exchangers is used in some designs. Modern extrusion technology can produce tubes with a wide variety of cross-sections and alloys.

Some FT reactors include a tube packed with extended surface materials (I.e. Beryl saddles, etc.) which are coated with the catalyst. The syngas flows inside the tube while the coolant flows on the outside of the tube. The tube internal diameter should be more than 3 inches to radially extract the heat, and the packing should be small size to avoid a wall affect, but a small packing size can produce pressure drops. So the reactor may not efficient from the ratio of surface area to volume standpoint. There is also the challenge that at the contact points the FT liquids can gather and form hard paraffin wax resin blockages which can require the bed to being cleaned or replaced often. Another approach is to use a larger tube and irrigate the column of pack catalyst pellets with the FT liquid or a solvent to carry the heat away from the catalyst packing—such a reactor is termed "trickle phase". This benefits from a uniform distribution of liquid to avoid hotspots and running the risk of forming resin blockages which create further hotspots and sometimes cause reactor run away.

Plate heat exchangers had been used with narrow spacing between the plates, in which the plates are coated with a catalyst. This concept achieves a large amount of catalyst surface area in a large reactor that is heat exchanged with the cooling liquid on the other side of the plates; thus, it is not volume efficient and thus expensive to fabricate. There are many variations of the concept of closely spaced plates that are catalyst coated to develop a plate array or matrix heat exchanger, but they can encounter narrow spacing, high pressure drop, flow obstruction and high cost of manufacture.

A more recent design uses commercial air conditioner cores to help cut the cost of manufacture, avoid narrow spacing, and provide a large amount of surface area, but these cores have to be stacked and placed inside of a large reactor vessel and then individually plumbed to the outside. This makes it a complex reactor assembly, a challenge to scale, difficult to maintain, and difficult to clean. And stacked cores have a complex FT liquid downflow around the heat exchange tubing passing through the fins that risks the formation of resin blockages at junction points. Unless the cores are custom manufactured to be large, the reactor does not easily scale up from a small pilot scale to a large commercial scale. This added stacked core complexity makes the maintenance even more challenging.

What is needed are new designs of FT reactors that overcome some of the past problems, and which present novel and non-obvious improvements to the FT process.

SUMMARY OF THE INVENTION

One embodiment relates to an improved rotary oven reformer that uses electric heat to carry out gas-phase steam/CO2 reforming in a small modular size that can be placed in the field or in an apartment as well as in a medical clinic or small hospital. The rotary oven in one embodiment has the shape of a concrete mixer with the non-rotating heating cartridge at its center and spiral flights around the inside. The central heating cartridge provides the electric heat which heats the steam and CO2 entering the rotary oven and further heats the exit syngas (preferably with the addition of more steam) to complete the reaction to destroy the organic material.

Another embodiment includes the internal spiral flight assembly having two purposes: one to rip apart the garbage bags by its sharpened, tooth-like edges and agitate the material to get good contacting for completing the chemistry while rotating in one direction and the second purpose is to remove any solid material at the end of the process cycle while rotating in the other direction at much higher speed. In one direction of rotation the edges of the teeth are angled toward the organic material and penetrate the organic material. In the other direction of rotation the spiral shape of the overall tooth pattern combined (presenting a spiral wall from the body of the teeth) presents a pathway that guides the rotating burned ashes toward the door of the oven.

Another embodiment includes the use of a second door that uses a scoop and a hopper to help remove the solids at the end of the process cycle. Near the end of the process cycle when the cooling cycle is nearly complete, the first door is open (which was closed during high temperature reformation) and the second door is closed. The left hand door which inserts the scoop and hopper into the interior of the drum oven for removal of smaller solids including broken glass. The largest solids such as larger sized cans and metal lids may not go down the hopper but stay in the drum and can be manually removed separately which encourages recycling of the scrap metals.

Yet another embodiment includes a woven ceramic cloth sock arranged outside the heated cartridge to remove any particulate material to keep it out of the exit syngas. This sock filter has its impacted solid deposits removed by the internal turbulence, vibration, and falling materials from the rotating drum. If the sock filter deposits become excessive after running many process cycles, the sock can be removed and replaced with a fresh one.

A further embodiment includes the use of the small sized solid oxide fuel-cell or other, preferably high temperature fuel-cell to use the generated syngas to produce both high temperature heat to heat the rotary oven as well as electricity to drive the process.

Yet a further embodiment includes an array of electric heaters radiating thermal energy onto the outside of the rotating oven to help evaporate moisture, heat the solids, and help the chemistry reactions complete faster.

Another embodiment includes made possible by the features enumerated above which allow the rotary oven reformer drum and the supporting process units and their controls to be small enough to permit the module to be a small portable size, such as 7 feet wide, 6 feet deep, and 7 feet tall in one example.

It is one aspect of some embodiments of the present invention to provide a design for a FT reactor using common finned tubes coated with catalyst in which the finned tubes can be removed individually for maintenance. In some embodiments, the gas flow in the reactor is countercurrent to the flow of FT liquid on the exterior of the fins. The FT liquid thus formed flows downward in the channels established by the fins and drips off of the tube fins unobstructed to avoid the formation of resin blockage. Further, the FT liquid removal has adequate volume for disengaging the froth and foam from the exit unconverted syngas that moves upward through the reactor.

Yet another aspect of some embodiments pertains to an FT reactor design using catalyst coated finned tubes placed in a pressure vessel such that the individual tubes can be removed for cleaning and maintenance. Still further alternative aspects of such a reactor design include one or more of the following, in any combination:

The FT reactor design wherein the pressure vessel is a cylindrical vessel with a flange top plate.

The FT reactor design wherein the individual tubes can be removed while keeping the reactor inerted, eliminating the need to reactivate the catalyst.

The FT reactor design wherein the falling FT liquid experiences an increase in finned tube temperature as it falls to the bottom of the reactor.

The FT reactor design wherein the syngas moving upward in the vessel is countercurrent to the down-flowing FT liquid.

The FT reactor design wherein the FT liquid leaves the bottom of the reactor spaced apart from the syngas exit port at the top of the reactor to assure complete disengagement of the gas from the liquid without the liquid being entrained in the syngas exit.

The FT reactor design wherein the externally-finned heat exchangers are adapted and configured to be substantially free of obstructions or create spots of long residence time with objectionable formation of resin blockages by the falling FT liquid.

The FT reactor design wherein the falling FT liquid fluid flow minimizes the formation of undesirable heavy paraffin wax.

The FT reactor design wherein the finned tube has a cylindrical cross section.

The FT reactor design wherein the finned tube has a generally hexagonal cross sectional shape.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

FIG. 13 is a schematic representation of a portion of a process according to another embodiment of the present invention, this portion being functionally associated with the portions of the same process shown in FIGS. 11 and 12.

ELEMENT NUMBERING

Figure 1:
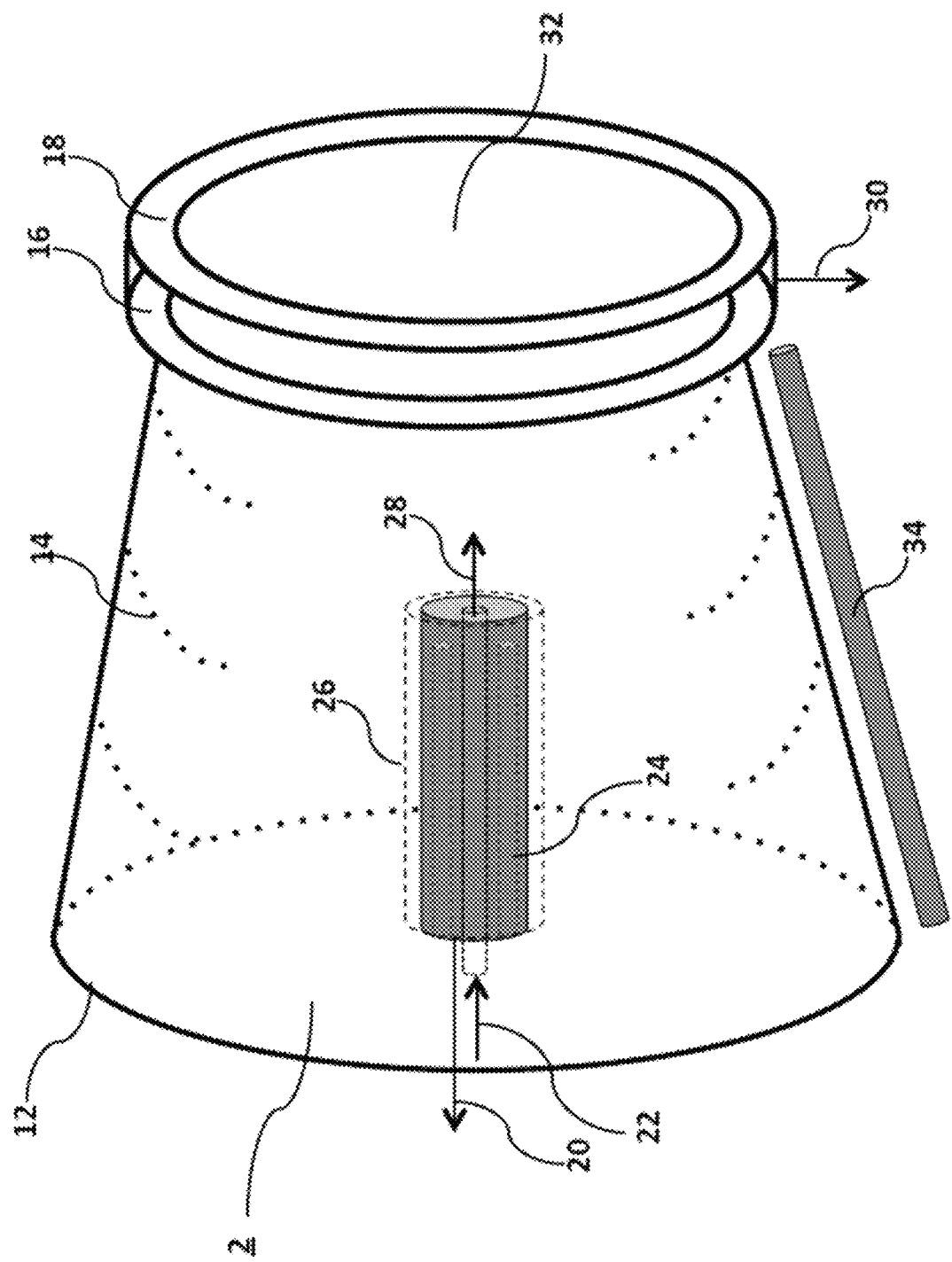
FIG. 1 is a schematic representation of a rotating oven according to one embodiment of the present invention.

The following is a list of element numbers and at least one noun used to describe that element. It is understood that none of the embodiments disclosed herein are limited to these nouns, and these element numbers can further include other words that would be understood by a person of ordinary skill reading and reviewing this disclosure in its entirety. These element numbers refer to FIGS. 1, 2, 3, and 4.

| | |
|---|---|
| 2 | ROR |
| 12 | ROR drum |
| 14 | spiral vanes |
| 15 | tooth |
| 16 | rollers |
| 18 | door seal |
| 20 | crude syngas |
| 22 | front opening |
| 22 | $CO_2$ inlet |
| 24 | cartridge |
| 25 | volatile gas from waste |
| 26 | filter sock |
| 28 | gas port, heat exchanger |
| 30 | solids |
| 32 | drum oven opening |
| 34 | oven heating rods |
| 36 | hinges |
| 38 | handle |
| 40 | purge gas inlet |
| 42 | left-hand door |
| 46 | insulating layer |
| 48 | hopper |
| 50 | scoop |
| 52 | exit |
| 54 | purge and cooling gas inlet |
| 60 | rotary seal |
| 61 | pump |
| 62 | door |
| 63 | battery bank |
| 64 | lock |
| 65 | fuel cell |
| 66 | control |
| 68 | control |
| 70 | control screen |
| 72 | reforming reactor |
| 73 | high purity syngas |
| 74 | heat exchanger |
| 75 | heat exchanger outlet |
| 76 | catalytic converter |
| 77 | exit gas |
| 78 | sorbent bed |
| 79 | clean gases |
| 80 | exhaust pipe, stream |
| 81 | stream |
| 82 | power |
| 83 | stream |
| 88 | tank |
| 89 | fuel |
| 90 | ambient exhaust port |
| 92 | cabinet |
| 93 | steam |
| 94 | rotary vacuum pump |
| 95 | fuel cell heat output |
| 96 | rotary vacuum pump |
| 97 | pumped recycle gas |
| 98 | power |
| 99 | exchanger heat output |

Element Numbering

The following is a list of element numbers and at least one noun used to describe that element. It is understood that none of the embodiments disclosed herein are limited to these nouns, and these element numbers can further include other words that would be understood by a person of ordinary skill reading and reviewing this disclosure in its entirety. These element numbers refer to FIGS. 6 to 10.

| | |
|---|---|
| 204 | cooling-tube assembly |
| 208 | catalyst coated fins |
| 209 | coolant supply passage |
| 210 | external tube |
| 211 | closed end |
| 212 | top flange |
| 214 | sanitary union |
| 216 | thermal fluid |
| 218 | tee |
| 220 | center tube |
| 222 | vapor-liquid exits; steam |
| 227 | inlet |
| 276 | heater |
| 228 | steam tubes; internal tube |
| 278 | pump |
| 230 | syngas; entry |
| 232 | reactor; vessel |
| 234 | port; exit |
| 236 | steel tubing |
| 237 | cooling media manifold; plenum |
| 238 | tube ring manifold; assembly |
| 240 | locking nut |
| 242 | tube |
| 244 | threads |
| 246 | ledge; dome |
| 248 | flange |
| 250 | coolant supply port |
| 252 | port |
| 254 | port |
| 256 | inspection port |
| 258 | port |
| 260 | coolant return port |
| 270 | reactor |
| 272 | streams |
| 273 | heat exchanging assembly; finned tubes |
| 275 | syngas inlet |

-continued

| | |
|---|---|
| 279 | liquid |
| 281 | stream |
| 282 | exchanger |
| 288 | air cooler |
| 290 | steam turbine; line |
| 291 | steam trap |
| 292 | stream; separator |
| 294 | stream |
| 298 | stream |

Element Nomenclature

Process Diagram

The following is a list of element numbers and at least one noun used to describe that element. It is understood that none of the embodiments disclosed herein are limited to these nouns, and these element numbers can further include other words that would be understood by a person of ordinary skill reading and reviewing this disclosure in its entirety. This numbering system and nomenclature refers to FIGS. 6 to 10. It is further understood that on those same figures the use of non-alphanumeric (i.e., the use of numbers without a letter prefix) refer to product streams being passed from one component to another.

Detailed Description of One or More Embodiments

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices and processes, and such further applications of the principles of the invention as illustrated therein being contemplated as would normally occur to one skilled in the art to which the invention relates. At least one embodiment of the present invention will be described and shown, and this application may show and/or describe other embodiments of the present invention, and further permits the reasonable and logical inference of still other embodiments as would be understood by persons of ordinary skill in the art.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advan-

| | | inputs | outputs |
|---|---|---|---|
| C-11 | Compressor | 1 atmos | 360 psig |
| C-13 | Compressor | 360 psig | 400 psig |
| D-23 | Stream Divider | FT gas/liquid bottom | Recycle gas |
| E-32 | Steam Turbine-Generator | Steam, 260F, 660 psig | Steam, 240F, 20 psig |
| F-24 | Flash tank/separator | Gas/liquid mix | Separate gas and liquids |
| F-9 | Flash tank/separator | Gas/liquid mix | Separate gas and liquids |
| H-2 | Heating Side of Heat Exchanger | 88° F. | 980° F. |
| H-20 | Heating Side of Heat Exchanger | 375° F. | 650° F. |
| H-6 | Heating Side of Heat Exchanger | 930° F. | 1850° F. |
| M-1 | Mixer | Recycle, steam, biomass | Recycle, steam, biomass |
| M-21 | Mixer | syngas and parafins | syngas and parafins |
| M-27 | Mixer | All water | All water |
| M-31 | Mixer | CO2 and light ends | CO2 and light ends |
| M-33 | Mixer | 508° F. | 508° F. |
| M-5 | Mixer | Steam, syngas | Steam, syngas |
| P-25 | Pump | water | |
| R-19 | FT Reactor | Finished syngas | Liquid hydrocarbons |
| R-3 | Equilibrium Reactor | biomass | syngas |
| R-7 | Equilibrium Reactor | Crude syngas | Finished syngas |
| S-10 | Component Splitter | Syngas & impurities | impurities |
| S-12 | Component Splitter | Wet syngas | Water and dry syngas |
| S-22 | Component Splitter | Light paraffins | wax |
| S-26 | Component Splitter | Gas and liquid paraffins paraffin | Separate gas/liquid |
| S-30 | Component Splitter | Liquid paraffins | Diesel product |
| S-4 | Component Splitter | Syngas & solids | solids |
| T-17 | Distillation Tower | Mixed paraffins | Separated lights and heavy |
| V-18 | Valve | Pressure control | |
| X-14 | Gas-to-gas Heat Exchanger | Hot syngas | Cool syngas |
| X-15 | Air Cooler Heat Exchanger | Hot syngas | Cool syngas |
| X-16 | Gas-to-gas Heat Exchanger | Hot paraffins | Cool paraffins |
| X-28 | Gas-to-gas Heat Exchanger | Hot paraffins | Cool paraffins |
| X-29 | Gas-to-gas Heat Exchanger | Hot paraffins | Cool paraffins |
| X-8 | Gas-to-gas Heat Exchanger | Hot syngas | Cool syngas | tages described herein are not to be construed as limiting to any of the claims. The usage of words indicating preference, such as "preferably," refers to features and aspects that are present in at least one embodiment, but which are optional for some embodiments.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

What will be shown and described herein, along with various embodiments of the present invention, is discussion of one or more simulations that were performed. It is understood that such examples are by way of example only, and are not to be construed as being limitations on any embodiment of the present invention. Further, it is understood that embodiments of the present invention are not necessarily limited to or described by the mathematical analysis presented herein.

Various references may be made to one or more processes, algorithms, operational methods, or logic, accompanied by a diagram showing such organized in a particular sequence. It is understood that the order of such a sequence is by example only, and is not intended to be limiting on any embodiment of the invention.

What will be shown and described herein are one or more functional relationships among variables. Specific nomenclature for the variables may be provided, although some relationships may include variables that will be recognized by persons of ordinary skill in the art for their meaning. For example, "t" could be representative of temperature or time, as would be readily apparent by their usage. However, it is further recognized that such functional relationships can be expressed in a variety of equivalents using standard techniques of mathematical analysis (for instance, the relationship F=ma is equivalent to the relationship F/a=m). Further, in those embodiments in which functional relationships are implemented in an algorithm or computer software, it is understood that an algorithm-implemented variable can correspond to a variable shown herein, with this correspondence including a scaling factor, control system gain, noise filter, or the like.

Various embodiments of the present invention include the application of steam/CO2 reforming technology which can accept small bags of waste, in some cases similar to what common residences generate in kitchens and dispose in garbage cans around the world. Garbage bags similar to this are being generated by the FOBs as well. For medical facilities the biotoxic and pathogen waste also can be disposed with this technology locally in secure medical facilities while avoiding the dangerous transportation to landfills or worse to medical incinerators. However, various embodiments contemplate the use of any type of organic material provided in any manner.

Various embodiments of the present invention include a rotary oven reformer (ROR) that provides a small and convenient access point for receiving the bags of garbage or medical waste, an efficient scheme for processing this material, and a scheme for extracting the metals and glass capable of recycle.

In FIG. 1 is shown the rotary oven reformer (ROR) that would have a capacity of about 500 pounds per day of waste/biomass feedstock, which can include a moisture content around 50%. A small amount of limestone is preferably added to assist the removal of acid gases. One way the waste could be fed in would be by use of plastic garbage bags with the maximum diameter of 18 inches, like used in a common residential kitchen. The ROR would take about 10 to 20 of these bags. The front door (42,62) shown in FIG. 2 would be closed against seal 18 and the ROR would be sealed with a slight negative pressure of 2 to 5 inches of water and processing started.

Now referring back to FIG. 1, the interior of the ROR 2 is heated by superheated steam and $CO_2$ shown entering 22 thru the center heating cartridge 24, as well as by a by a plurality of heating rods 34 on the exterior. The ROR drum 12 is set into rotary motion in a clockwise direction at a few RPM. The plastic bags that are placed through the front opening 32 are tumbled by rotating on tires rollers 16 against the outer surface of the drum, such that the bags come into contact against spiral vanes 14 with sharp edges or teeth which break open these bags and disperse the waste/biomass contents and contact it with the hot superheated steam and $CO_2$.

As the process begins, the temperature of the ROR ramps from room temperature up to 900° F. at the end of the cycle but with the superheated steam and $CO_2$ entering the ROR at 1200 to 1800° F. The reforming chemistry prepares high $H_2$ syngas. This syngas containing some particulates is pulled out through the outside of the center heating cartridge through a centered metal filter sock 26, which is removable for cleaning. This non-rotating center heating cartridge 24 is glowing yellow orange at about 1400 to 1900° F., with its temperature radiating onto the tumbling waste/biomass. The outside of the ROR is heated by electric heating elements 34 about preferably 4 feet long and preferably fixed in place. In some embodiments only the drum is rotating, using a center heating cartridge 24 that preferably does not rotate and is gas-fed by a concentric rotating gas seal between the rotating drum and non-rotating heating element apparatus.

After a period of operation, and with the end of cycle temperature at its maximum for about an hour, the processing cycle is complete, which is expected to last a total from 4 to 20 hours, at which point the cooling cycle begins. The cooling gas entering at gas port 28 can be dry nitrogen or $CO_2$, as examples. Once below 300° F., the right hand door 62 hanging from its own hinge 36 is opened with rotary seal 60, unlocked by lock handle 64, and the left-hand door (attached by its own, separate hinge 36) is closed by handle 38, as best seen in FIG. 2.

Figure 2:
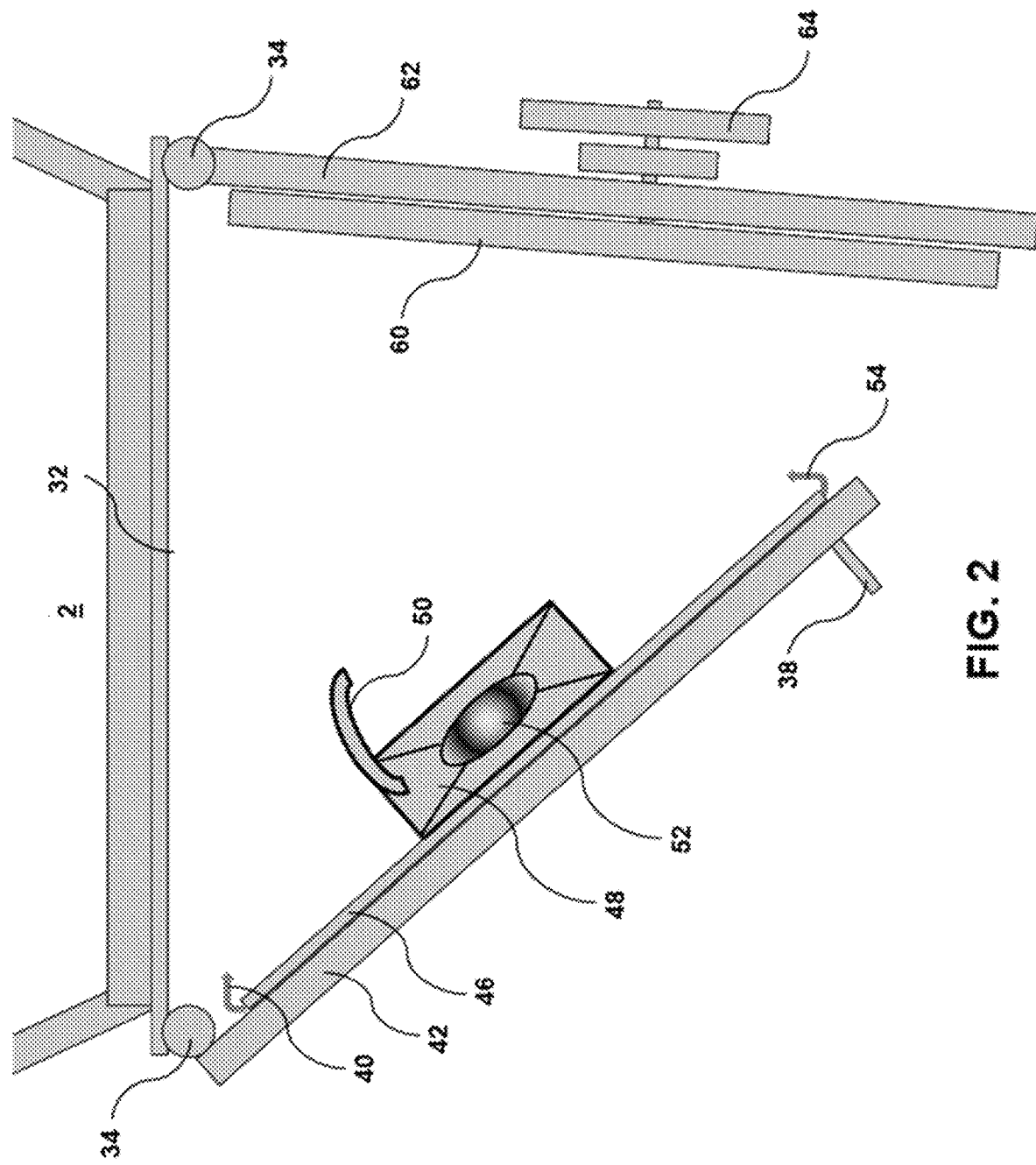
FIG. 2 is a schematic arrangement of a portion of an apparatus according to one embodiment of the present invention.

FIG. 2 shows the door arrangement of one embodiment. FIG. 2 shows the left-hand door 42 insulated by plate 46 hinged at 32 that contains a removal device such as a scoop 50 and a hopper 48 for removing any solids 30 that are smaller than about a half an inch through exit 52. With this scoop door closed, the drum rotation is set to counter-clockwise with the spirals 14 raising the small particulate material via scoop 50 to the front and down the scoop 50 into a sealed bin on wheels. In one embodiment the drum can contain about 75 pounds of solid grey-color material consisting of broken glass sand carbonaceous graphite, oxides, and salt and lime. Solid items such as cans and metal lids that would not go through the scoop are found in the top spiral at the door edge for manual removal. Purge and cooling gas continue to flow into the enclosed rotary oven 2 through the gas inlets 40 at left and 54 at right.

Figure 5:
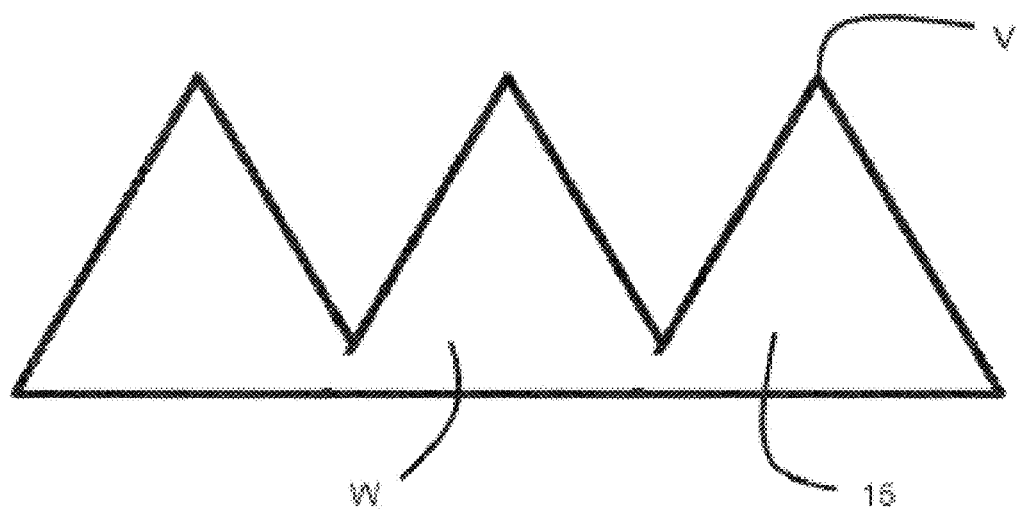
FIG. 5 is a schematic representation of a toothed-spiral flight according to one embodiment of the present invention.
Figure 5:
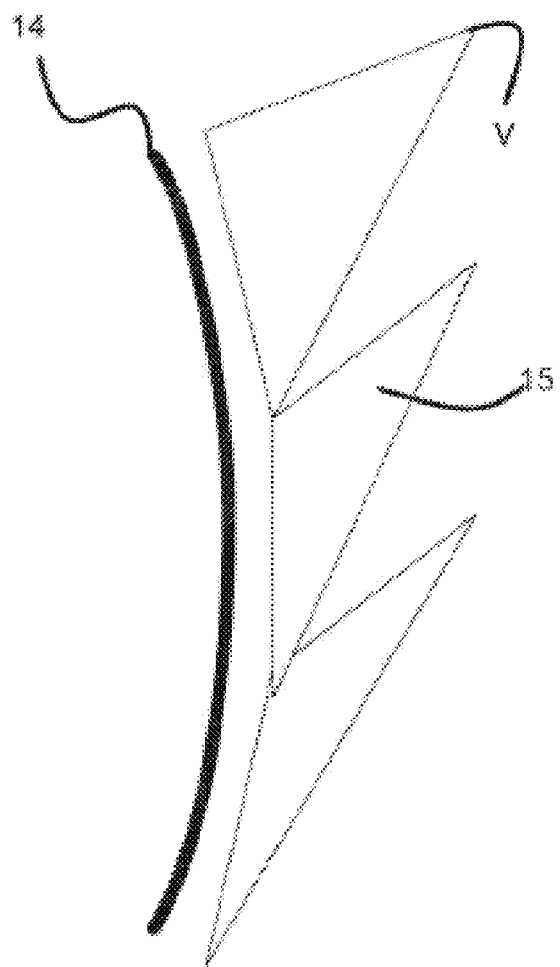

The spiral arrangement 14 of teeth 15 is schematically depicted in FIG. 5. FIG. 5 shows three adjacent teeth 15 having a triangular shape. Each tooth 15 includes a sharp vertex V that is adapted and configured for puncturing the waste bags, and otherwise penetrating and impaling the waste material as it tumbles. The top view in FIG. 5 shows a view of three teeth as viewed orthogonally from their overall spiral shape. The bottom view of FIG. 5 shows depicts the teeth more from an elevated view relative to the spiral shape 14, showing that the base of the teeth form the spiral shape, and further that the body of the tooth (which is generally planar) is non-perpendicular to the inner diameter of the oven. When the oven rotates in one direction, the sharp vertices V of the teeth lead (i.e., are in front of) the bottom wall W that connects to the inner diameter. With such rotation, the teeth are adapted and configured to impale the waste. For rotation in the opposite direction, the wall W of the teeth leads the teeth vertices V. Therefore, in this opposite direction of rotation the teeth are not angled so as to penetrate the waste. However, the spiral shaped wall W provides a ledge that pushes against the waste. This ledge, in combination with the spiral shape, pushes the waste material toward the end of the oven having the doors.

Figure 3:
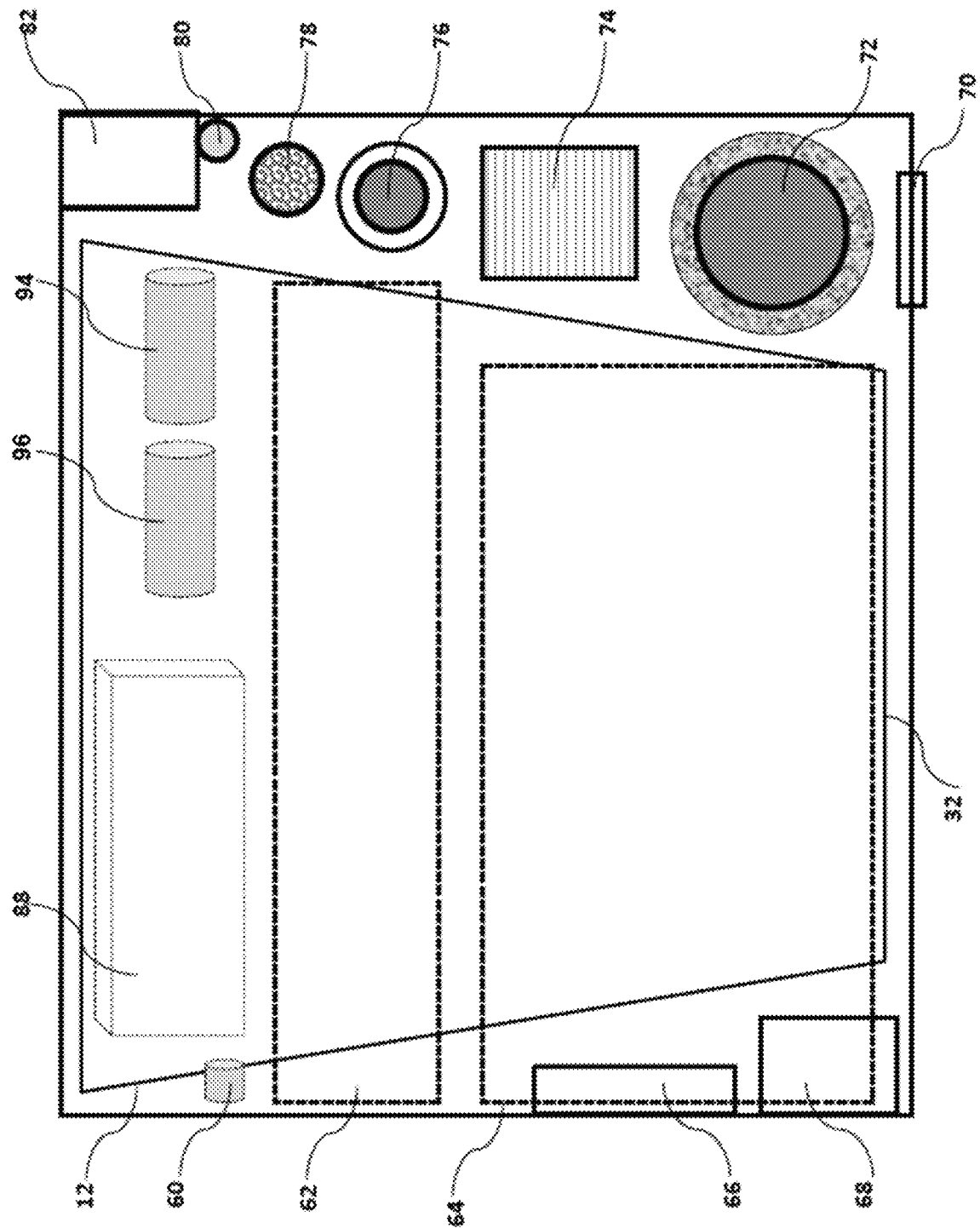
FIG. 3 is a schematic representation of another embodiment of the present invention.

FIG. 3 shows a cross-section of the appliance which is about 7 feet wide 6 feet deep and 7 feet tall in one embodiment. The ROR drum 12 is at the top of this cross-section. At the front right is the main steam/$CO_2$ reforming reactor 72 used for cleanup to produce the syngas. This very hot syngas is cooled by a heat exchanger 74 (in one embodiment a plate heat exchanger) next in line with the cool syngas going to the fuel-cell 65, preferably located down at the bottom of the enclosure. The heat from this heat exchanger and the heat from the fuel-cell are used to heat the superheated steam and the $CO_2$ that is fed into the ROR 2 at inlet 22. These clean gases are passed into the catalytic converter 76 which removes any carbon monoxide prior to being discharged outside. The cool exit gas is passed to a getter/sorbent bed for capturing any acid gases and heavy metals before moving further into the process. Heat from the catalytic converters is also used to provide heat to superheated steam entering 21 and also heat the ROR 12. Exit gases are cleaned and carbon oxidized to $CO_2$, leaving at exhaust pipe 80. Also at the bottom of this enclosure are the rotary vacuum pumps 94 and 96 and a battery bank 63 to supply start up heat and power and uninterruptible power 82 for the controls, 66 and 68, as well as 70, the control screen. Diesel fuel supply at 88 is pumped to the fuel cell 65 for startup electricity and heat.

Figure 4:
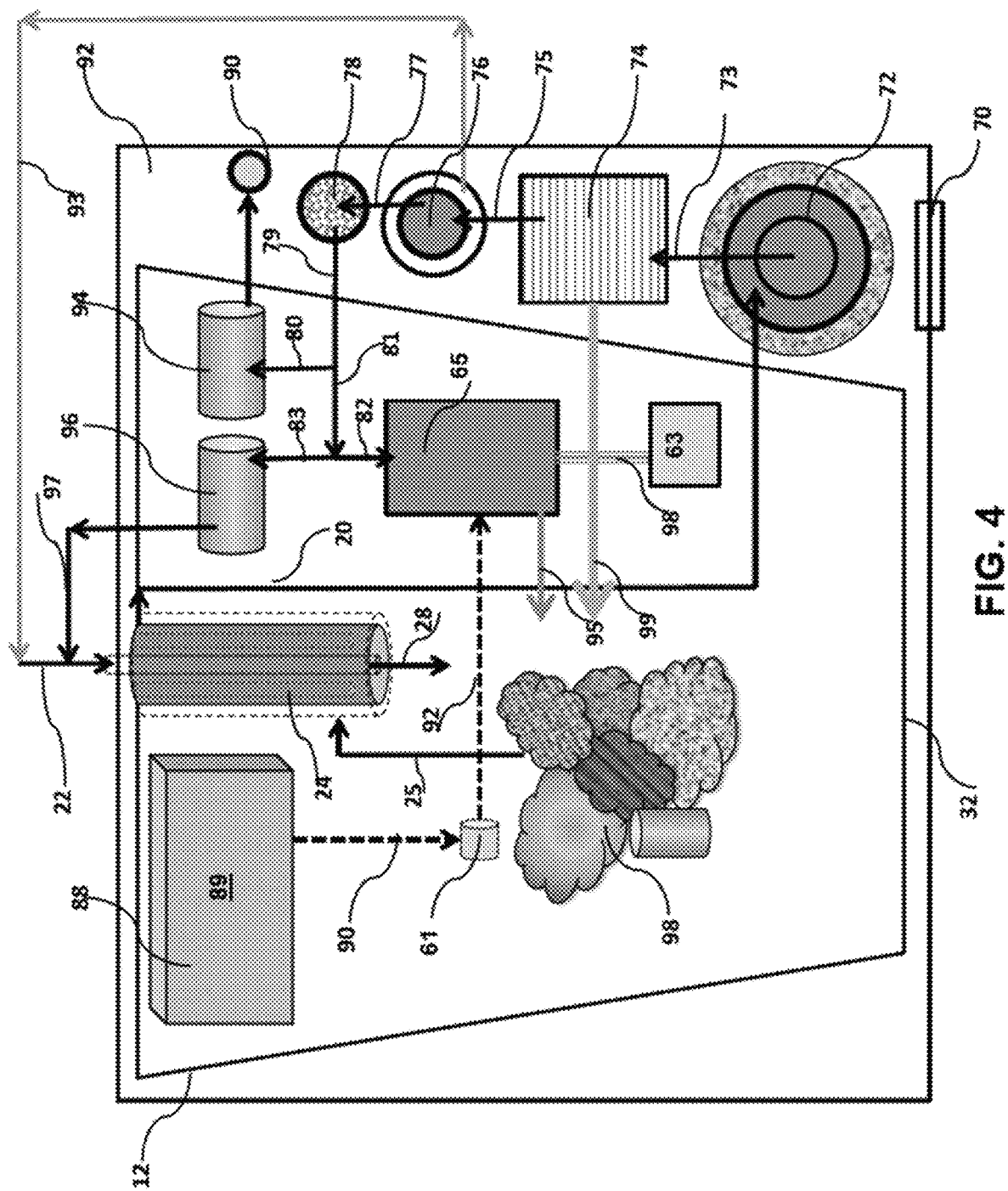
FIG. 4 is a process flow diagram according to one embodiment of the present invention.

FIG. 4 shows the process flow diagram that graphically implements the details of the paragraphs above. FIG. 4 shows the same cross-section of the appliance but with the process schematic units and flow-streams located in cabinet 92. The steam and $CO_2$ 22 enters the heated cartridge 24 at the top of this cross-section and enters the ROR 12 at gas port 28. The biomass and/or waste evolve volatile gasses 25 and produces crude syngas 20.

At the front right is the main steam/$CO_2$ reforming reactor 72 used for final cleanup to produce the high purity syngas 73. This very hot syngas 73 is cooled quickly by a plate heat exchanger 74. Next in line with the cool syngas 73 goes via connection 75 to the catalytic converter 76 via heat exchanger outlet 75 and then on to fuel-cell 65 down at the bottom of the enclosure. The heat 99 from this heat exchanger 74 and the heat 94 from the fuel-cell 65 are used to heat the waste in the ROR 12. The catalytic converter 76 heats the superheated steam 93 and the $CO_2$ that is fed via 22 into The ROR. The catalytic converter exit gas 77 is passed to a getter and sorbent bed 78 destroying any acid gases before they are vented. A portion of these clean gases 79 are pulled into the pumps 94 and 96 via stream 80 and 83, respectively. Stream 80 is vented via 94 at ambient exhaust port 90 and stream is split into 83 and 82, the latter going to fuel cell 65. The other fraction 83 recycles via 97 to heated cartridge 24 to enter ROR 12 via gas port 28. Heat from the catalytic converters also used to help heat the ROR. At the bottom of this enclosure are located the two rotary vacuum pumps 94 and 96, diesel fuel tank 88 to supply fuel 89 via fuel pump 61 to the fuel cell 65 for startup and for uninterruptible power 98 for the controls.

Figure 6:
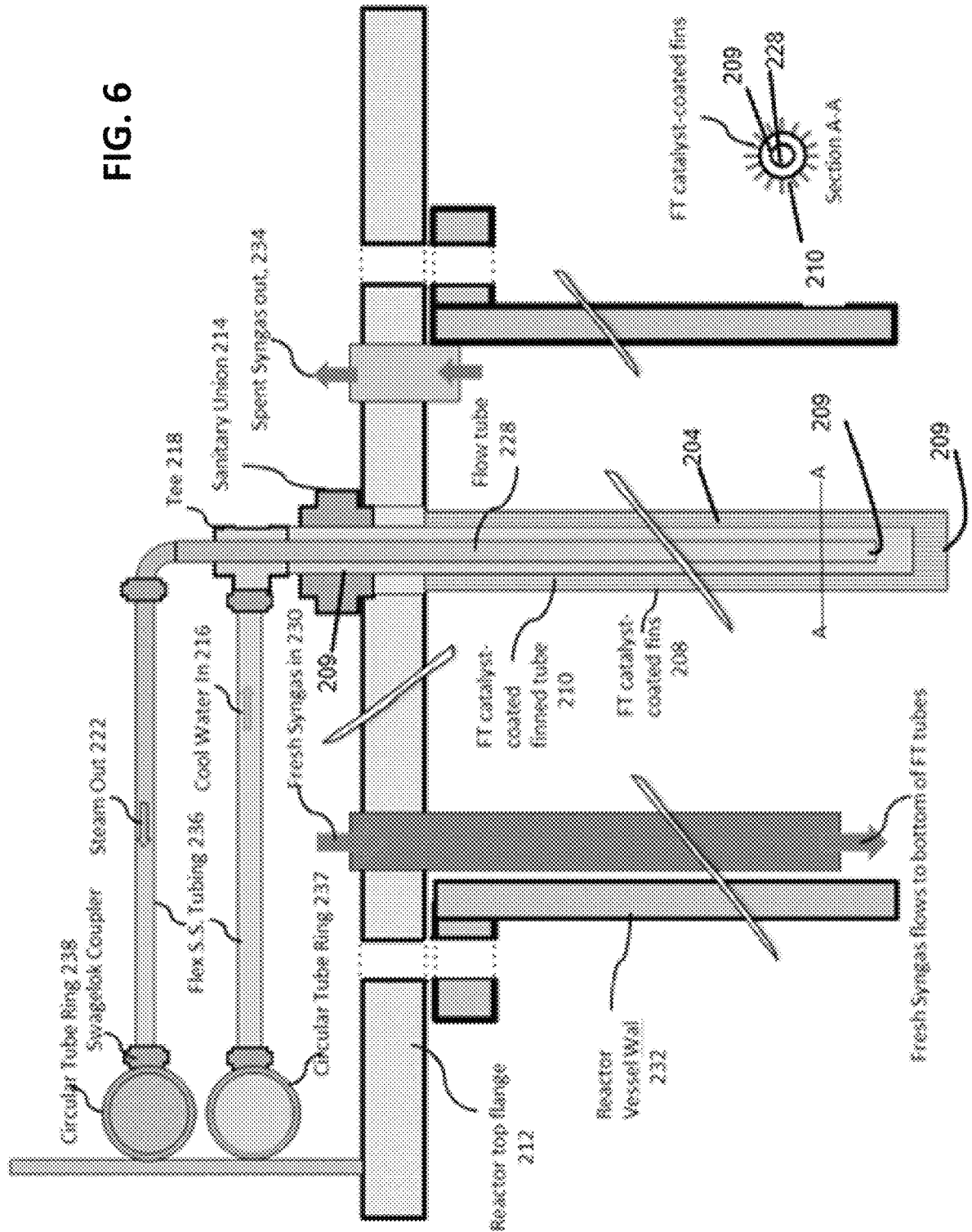
FIG. 6 shows a schematic, cross-sectional representation of a single catalyst-coated finned tube with all connections at the top by flexible tubing, according to one embodiment of the present invention.

FIG. 6 shows a portion of an FT reactor that includes a plurality of catalyst-coated finned tube assemblies 204 according to one embodiment of the present invention. Each finned tube assembly 204 comprises a pair of a concentrically-arranged inner tube 228 and outer tube 210. Each outer tube includes a plurality of cooling fins 208 extending from the tube outward. The cooling fins 208 are coated with a catalyst that is adapted and configured to produce Fischer-Tropsch reaction products from synthesis gas.

As shown in Section AA of FIG. 6, in one embodiment the fins are longitudinally arranged and generally parallel down the length of the tube assembly. This linear arrangement surface is adapted and configured to provide a large surface area for improved operation of the catalyst, as well as relatively free-flowing passageways or channels for the downward movement of heavier FT products that form on the catalytic surfaces. However, yet other embodiments of the present invention include still other fin shapes, such as spiral shapes (coacting with the o.d. to form spiral channels) that extend along the length of the tube assembly. Preferably, the cooling fins provide relatively little obstruction to the gravity-induced, downward movement of the heavier FT liquid products. In some embodiments, each cooling fin provides a surface that extends along substantially the entire length of the tube assembly 204, so that the fin itself is not ever a barrier to downward movement.

Figure 7:
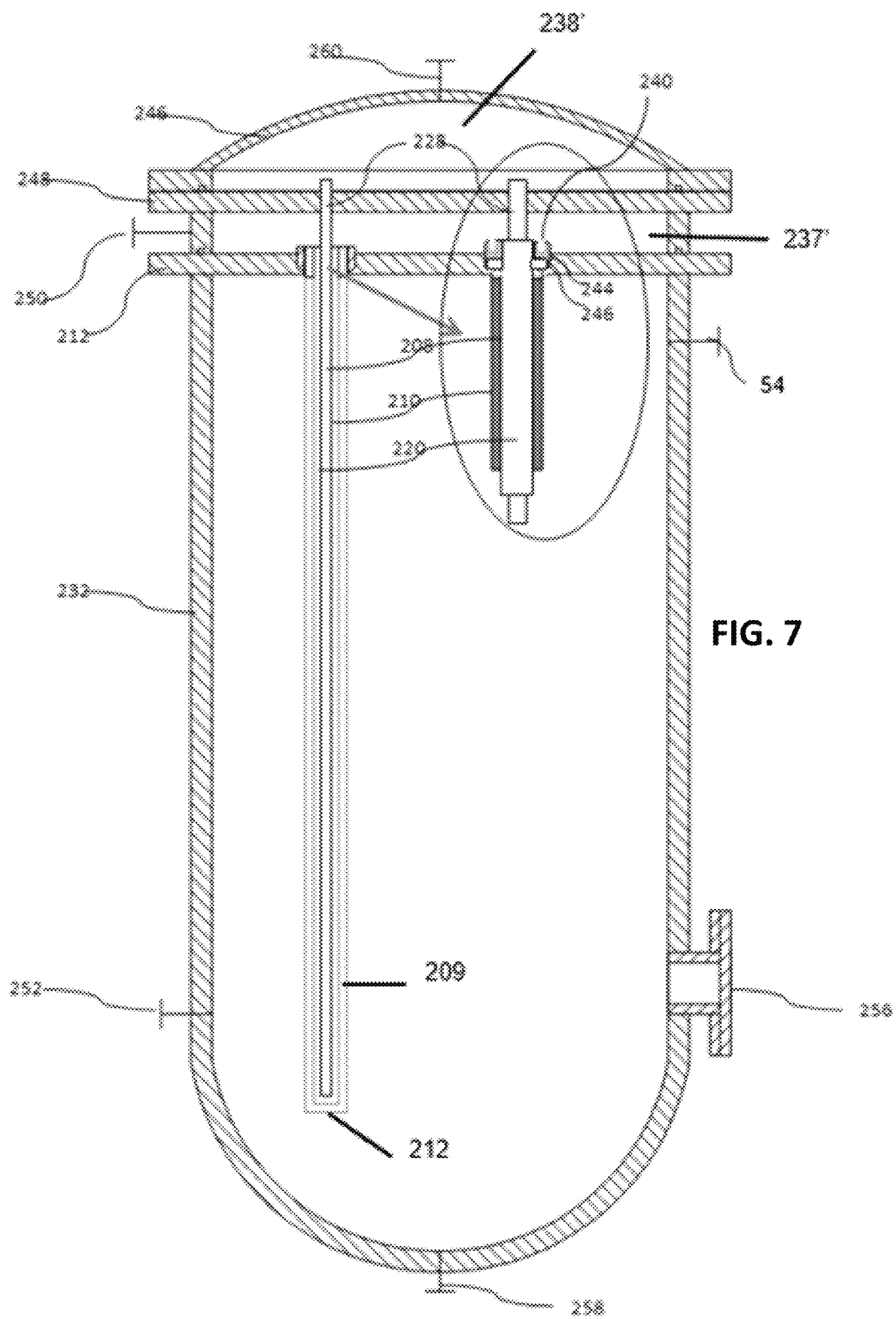
FIG. 7 shows a cross sectional representation of catalyst-coated finned tubes arranged in the reactor vessel lid, according to another embodiment of the present invention.

In one embodiment, each tube assembly 204 comprises a tube within a tube. The outer tube 210 includes an opened end that operates as an inlet for cooling media. This opened end is coupled by way of a union to a flange of the reactor for structural support and sealing. The distal-most, closed end 212 of external tube 210 extends downward toward the bottom of the reactor (as shown in FIG. 7, proximate to the inlet 275 for syngas (referring to FIG. 9).

The inner tube 228 provides for upward return of the media as it is heated from contact with the inner diameter of outer tube 210. The inner tube 228 has an opened end 227 located near the distal-most closed end 212. This opened end 227 provides an inlet for the heated media that has flowed downward in the annular passageway 209 that is formed between the inner diameter of the outer tube and the outer diameter of the inner tube 228. The opened end 222 of the inner tube 228 provides the heated media to a collection reservoir, such as either the manifold 238 shown in FIG. 6 or the plenum 238' shown in FIG. 7.

An FT catalyst-coated finned tube 210 is inserted through reactor top flange 212 attached by means of a sanitary union 214 through which the tube can be removed. At the top of the finned tube 210, a cooling media supply manifold 237 provides the cool thermal fluid 216 that enters at the side of the tee 218, then passing downward through the finned tube, boiling, and flowing upward through a center tube 228 to exit at the top as the hot two-phase vapor-liquid exits 222 to media return manifold 238.

Referring to FIG. 6, through the top flange 212 the fresh syngas 230 enters a tube that runs downward nearly the length to the bottom of the reactor 232 introducing fresh syngas that fills the chamber around the fin tubes 210. A substantial fraction of the syngas reacts on the catalyst 210 to produce FT liquid product and the spent syngas exits the reactor at port 234. Since the catalyst-coated fins get hot from the exothermic reactions of the syngas to form FT liquid, the heat is removed by cooling water that enters as coolant 216 and leaves as steam 222. Although water is shown as the example, other thermal fluids can be used. The connections to each of the fin tubes 210 are made through a flexible stainless steel tubing 236 to a circular tube ring 237 surrounding the top of the reactor above the flange. The steam leaves at two layers of tubing that constitutes a double steam manifold at the top. This design in some embodiments allows individual fin tubes to be removed and fresh ones reinstalled by connecting the flexible tubing 236 to the entry tee 218. In this way the finned tubes can be cleaned and the catalyst refreshed and recoated on the finned tubes and remounted into the reactor.

FIG. 7 shows a large pressure vessel 232 and flange 212 at the top through which fin tubes 208 are hung. The reactor of FIG. 7 is similar to the reactor of FIG. 6, except that in FIG. 7 the coolant supply passage 209 is supplied with the low temperature cooling media by way of a cooling media plenum 237' that is created between flanges 212 and 248. All coolant supply passages are open to this volume between the flanges, which is provided with coolant by way of port 250. It can further be seen that all of the coolant return passages 228 are in fluid communication with the plenum chamber 238' between flange 248 and dome 246. Steam can be removed by way of coolant return port 260.

These tubes 210 have fins extending radially from tube 220 and coated with catalyst 210. These catalyst tubes 208 can be individually removed from the reactor by the following steps: The upper flange 248 is unbolted from the flanges 212, and raised upward which includes the steam tubes 228. The next step is to loosen locking nut 214 by means of its outside diameter threads 244 using the appropriate spanner wrench which removes pressure on the sealing ledge 246 attached to the flange 248. At this point tube 220 containing catalyst fins 210 can be removed from the top individually.

Figure 8:
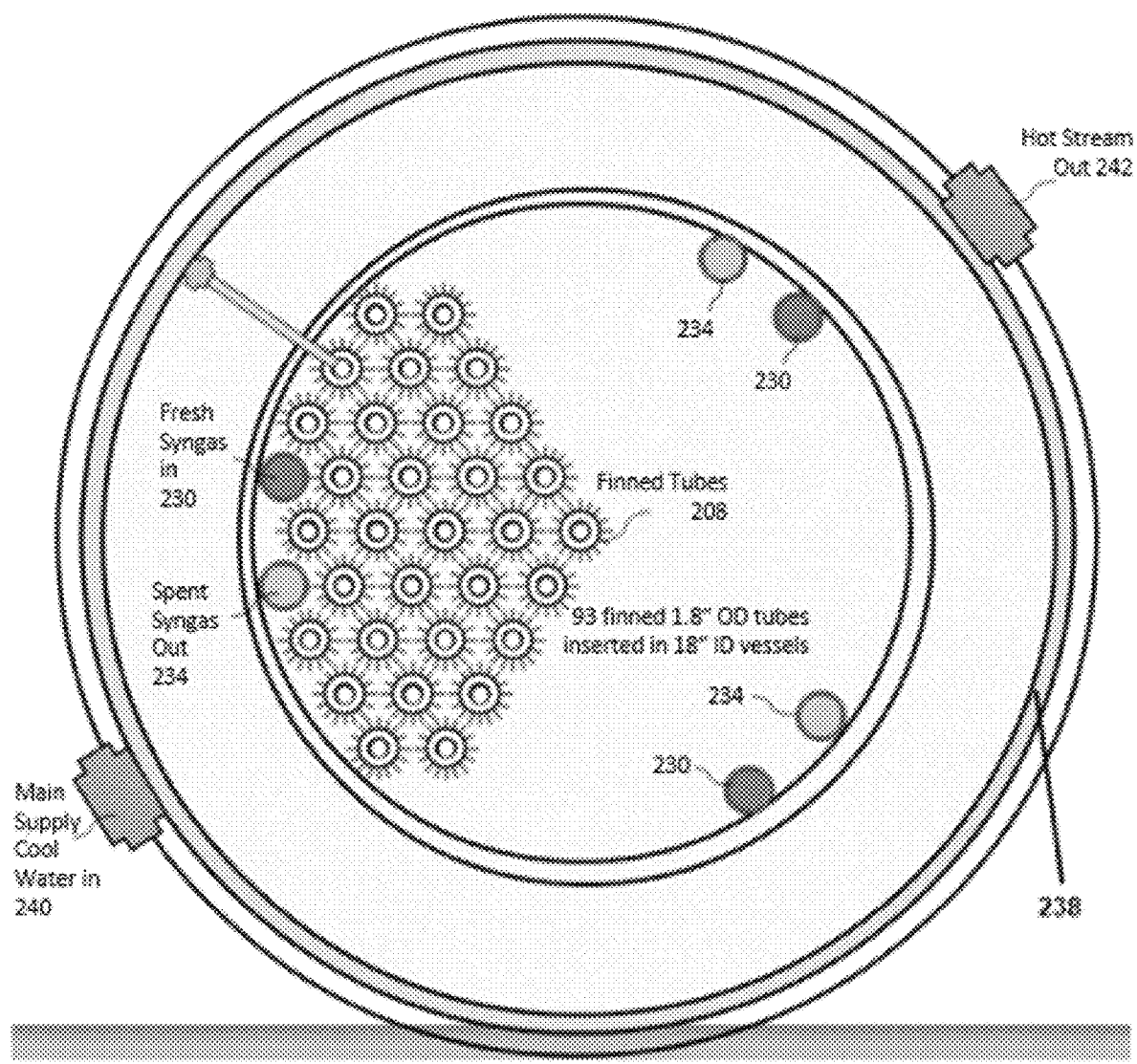
FIG. 8 is a schematic representation of the apparatus of FIG. 7 looking down, which is a reactor design with finned tubes supplied from inside reactor.

Now referring to FIG. 8, both the top flange and the cross-section of the reactor are shown with the circular tube manifold 238 and the multiplicity of finned tubes 208. At three locations 120° apart there is shown the entry 230 and exit 234, syngas supply and discharge pipes as arranged. The circular manifold assembly 238 is fed by a large main supply of cooling water entering at 240 and the hot steam exiting at a large tube 242.

Into vessel reactor vessel 232, shown in FIG. 8, is fed fresh conditioned and balanced syngas through port 252 and the spent syngas exits at port 254. Reaction of the syngas on catalyst fins 210 produces a FT liquid which falls to the bottom of reactor 232 and exits at port 258 while the steam that is produced from the heat of the fin tube 208 exits at the top of the steam dome of the vessel at port 260. An access port 256 is provided for inspecting and cleaning the vessel.

Figure 9:
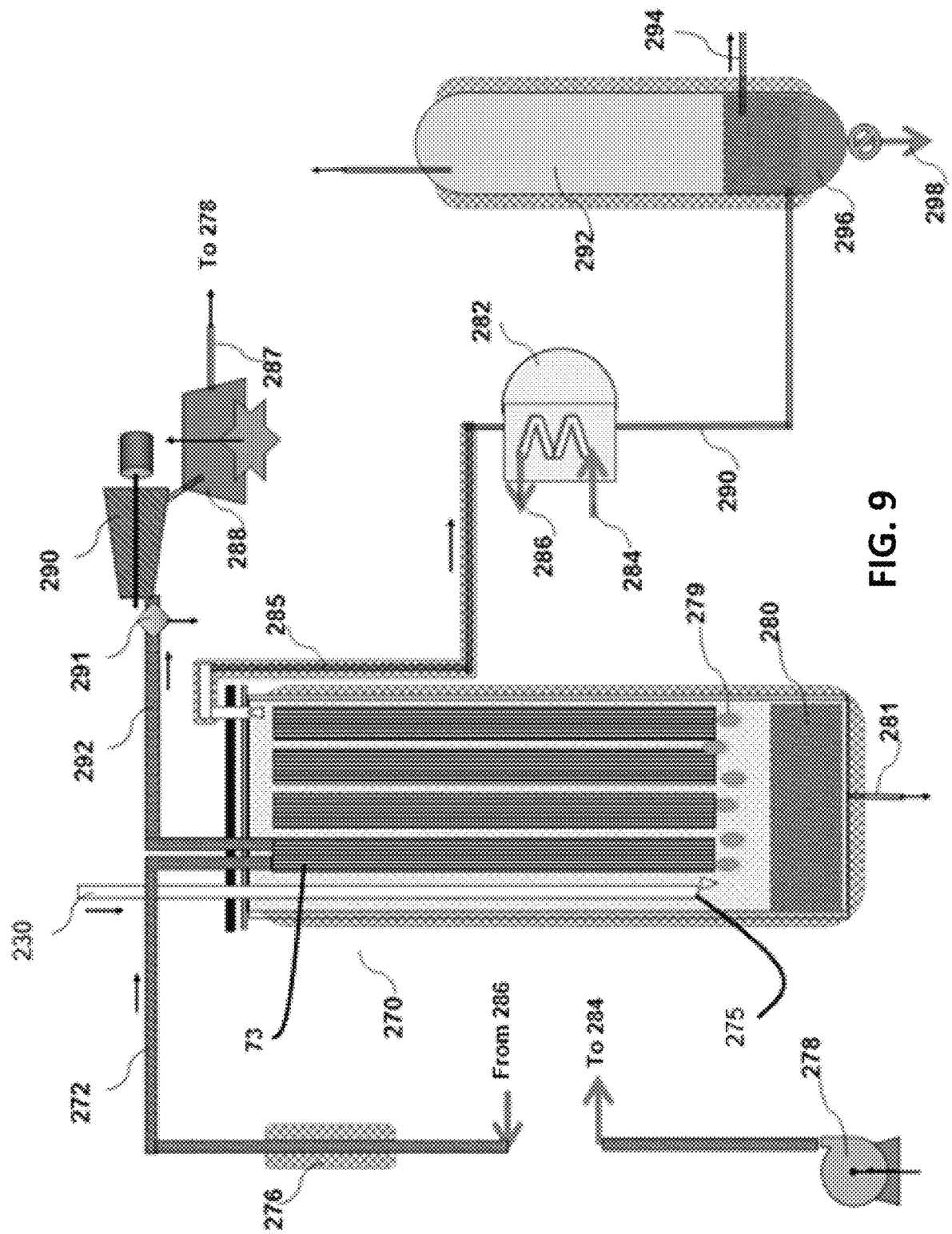
FIG. 9 is a schematic representation of a process and instrumentation diagram for an FT skid interfacing to catalyst coated finned tubes according to one embodiment of the present invention.

Referring to FIG. 9, there is shown a schematic representation of a process for converting syngas according to one embodiment of the present invention. The FT reactor 270 is fed with cool water in streams 272 cooling the catalyst finned tubes. The cool water is pumped by pump 278 and temperature controlled by heater 276 to assure that the water is a few degrees below its boiling point. The generated steam plus a small amount of entrained water leaves in stream 292 to pass through a steam trap 291 to remove as much entrained water as possible and from there enters the electricity generating steam turbine 90 with its exhaust cooled by air cooler 288. From there the cool condensate water is passed to pump 278 to complete the water-steam cycle loop.

The syngas enters the bottom of the FT reactor via 274 where it is reacted on the catalytic surface of a plurality of finned tube heat exchanging assemblies 273 and passes upward in the reactor generating the FT liquid 279 which drains off of the increasingly warmer finned tubes 273 countercurrent down to the bottom of the reactor and exits as stream 281 of crude FT liquid product.

It is understood that the catalyzing, finned tube heat exchanger 273 are similar to the finned tube assemblies 208 shown in FIGS. 6, 7, and 8. The spent syngas leaves the top of the FT reactor as stream 285 to be cooled by heat exchanger 282 using cool water from pump 278 entering it at 284 and leaving 286 to enter the temperature control heater 276. The cool syngas together with some liquid condensate leaves the heat exchanger 282 via line 90 from which it enters the three-phase separator 292 where the hydrocarbon leaves via stream 294 as nearly finished FT liquid product and the condensed water leaves as stream 298.

Various aspects of some embodiments of the present invention can be better understood by considering other examples. As one example considers a simple cylindrical reactor vessel that is 18" ID and 72" tall with a volume of 20,400 in3 or 11.8 ft3 and has a height allocated for the catalyst option that is 40" tall. In one embodiment, a finned tube array as shown in FIG. 7 contains 112,500 in2 of catalyst coated surface. Such a design compares favorably to existing designs that have the same catalyst volume but only 38,883 in2 of catalyst area. The reactor design disclosed in FIGS. 6 and 7 can contain nearly three times (3×) more catalyst surface area. Further, since there is less wasted space, the finned tubes can be extended 35% more in length to gain another 35% of catalyst area to achieve four times (4×) the catalyst area.

Yet another example showing various aspects of some embodiments of the present invention pertains to the improved maintenance that can result. Too many times the catalyst becomes poisoned from contaminants in the syngas and the catalyst should be replaced. A typical FT reactor should be removed from the plant and completely opened to remove the catalyst materials and structure, the vessel cleaned, reloaded with fresh catalyst and remounted in the FT process plant, catalyst reactivated with $H_2$ at high temperature at a cost of many weeks of shutdown. The reactor design taught herein eliminates the costly labor hours and long shutdown times, since individual finned tubes can be pulled out and replaced in the field, while still keeping the reactor inerted saving 70% of the labor hours.

In addition, sometimes the catalyst develops hot spots and melts or heavy resin is formed that plugs off the FT liquid flowing down the finned tube and forms excessive heavy paraffin wax. These failed finned tubes can be identified by an IR displaying camera to reveal obstructed flow of steam product or cooling water, together with finned tube internal temperatures measured by its type K thermocouples. This single failed finned tube can be removed and replaced at huge savings and the FT plant restarted often while it is still warm, still inerted; reducing start-up time.

Yet other aspects of some embodiments of the present invention can be understood by considering the scalability offered. Individual finned tubes can be removed, and the vessel is easily scaled in diameter where additional tubes can be added or even interchanged. Also, the vessel can be made larger as necessary and multiple tube holes can be plugged and later filled with finned tubes adding capacity that is made possible by debottlenecking the process. A further advantage is that individual tubes can have different lengths as well, adjusting the capacity of the FT reactor. And even further advantage with this design is that the reactor can be scaled in diameter and length without changing the design concepts. For example, the reactor shown in Example 1 can have an ID of 18 inches and a height of 72 inches, producing one barrel per day of FT liquids. A full-size reactor of 8 feet in diameter and 12 feet in height, simply by scaling this design, is projected to produce 57 barrels per day or 2400 gallons per day of FT liquids. This single FT reactor would be the appropriate size for a 25 ton per day machine that would ideally fit a typical dairy farm to serve all of their fuel needs.

Figure 10:
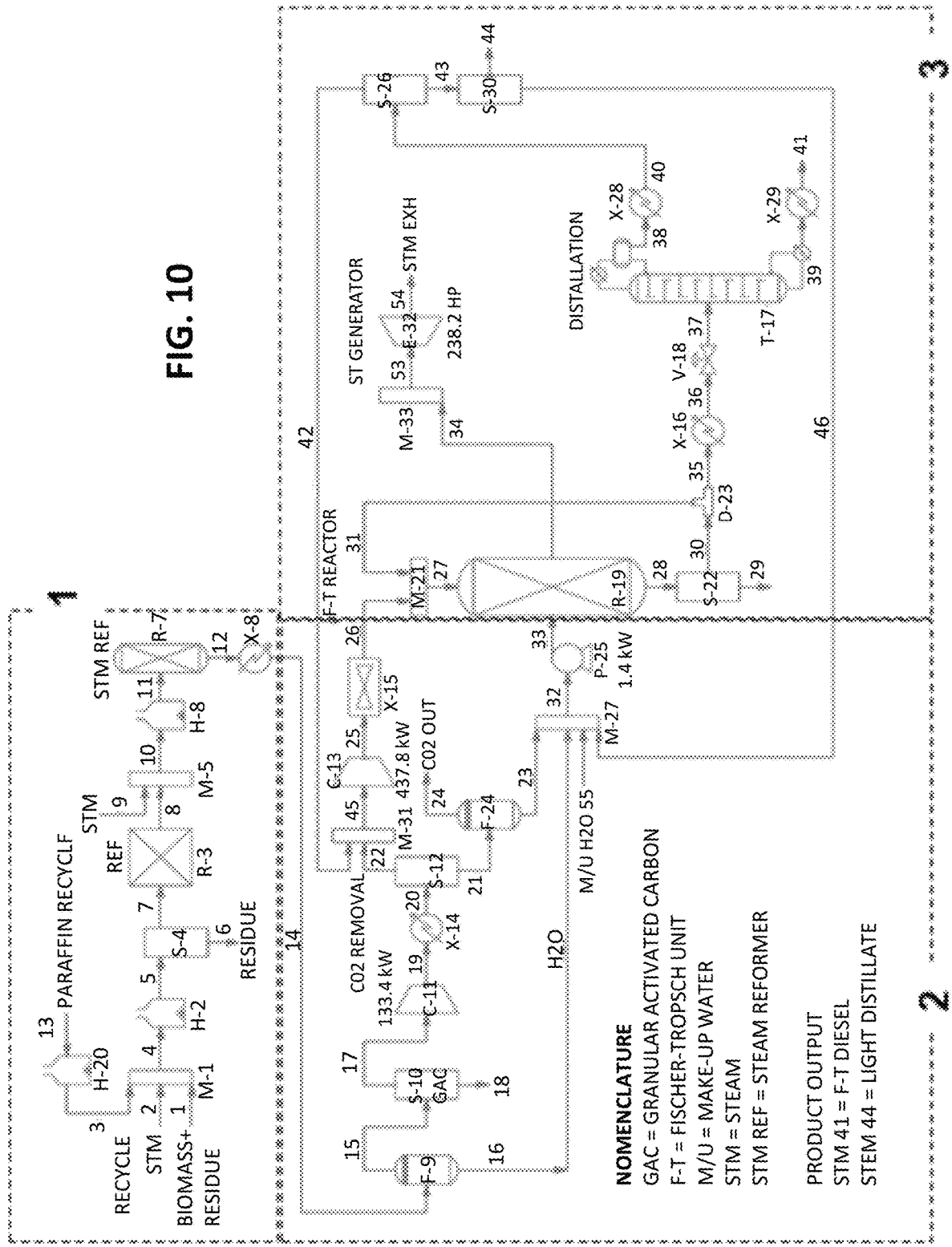
FIG. 10 is a schematic representation of a process according to another embodiment of the present invention.
Figure 11:
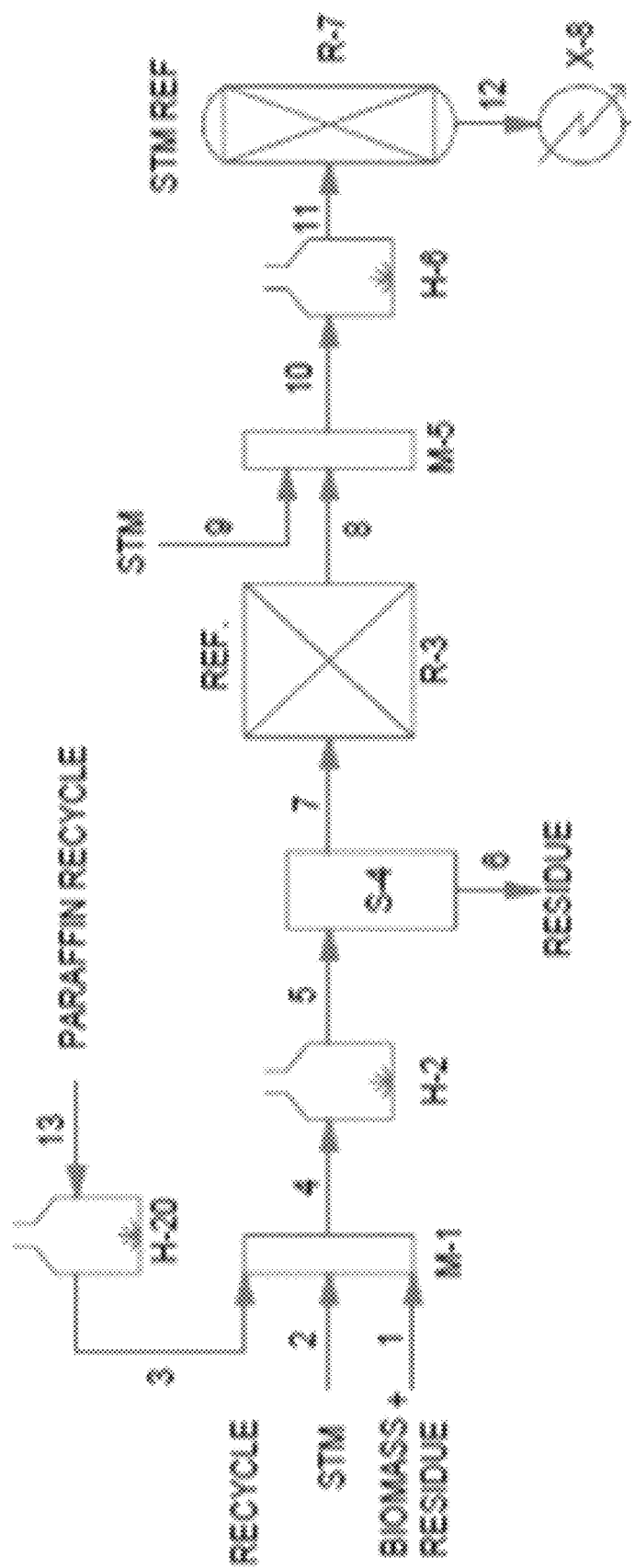
FIG. 11 is a schematic representation of a portion of a process according to another embodiment of the present invention, this portion being functionally associated with the portions of the same process shown in FIGS. 12 and 13.
Figure 12:
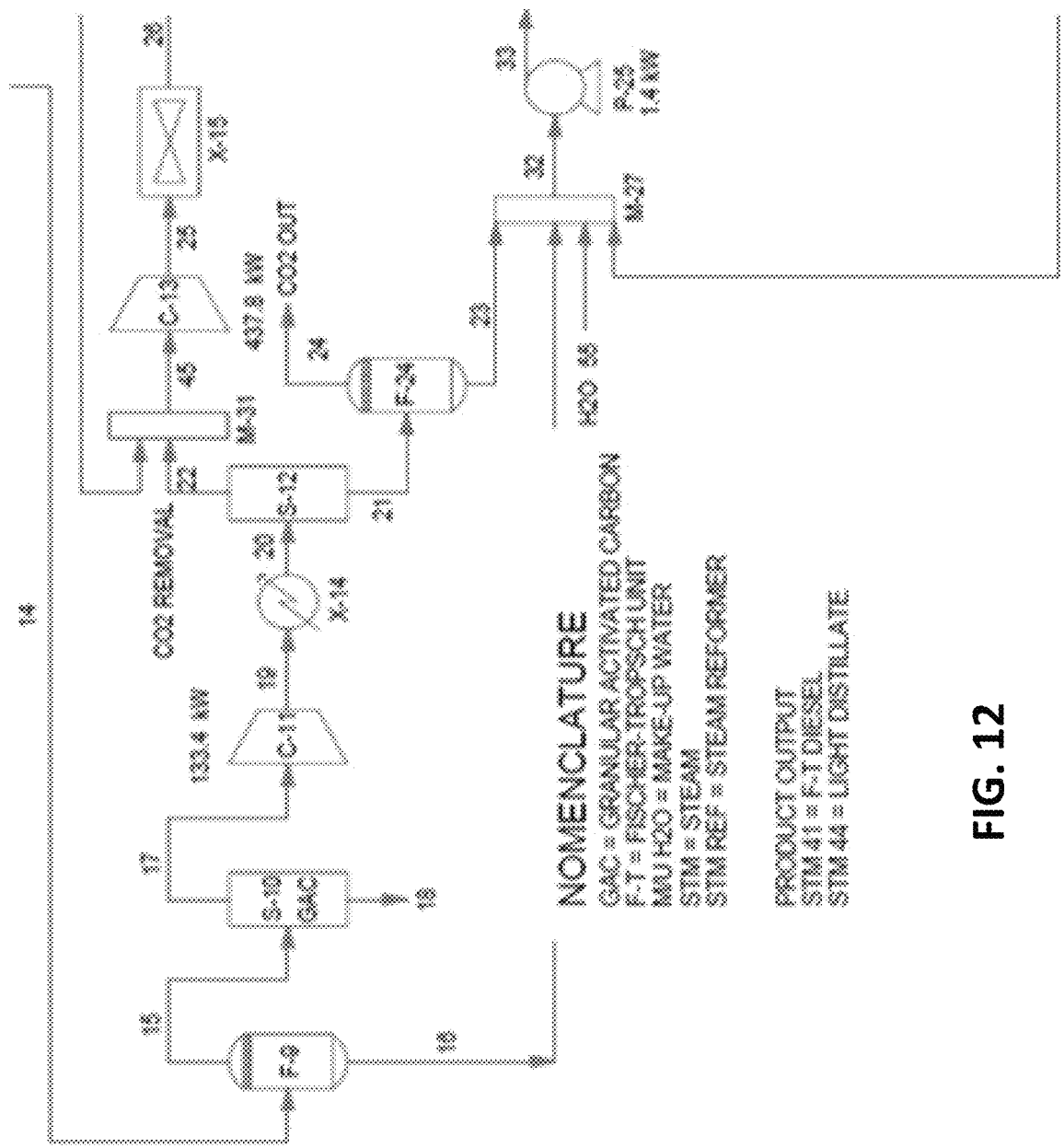
FIG. 12 is a schematic representation of a portion of a process according to another embodiment of the present invention, this portion being functionally associated with the portions of the same process shown in FIGS. 11 and 13.

The process shown and discussed with regards to FIG. 9 was the subject of multiple computer simulations. The process diagram used for the simulations is shown in FIG. 10, the subject matter of FIG. 10 also being shown in the three portions identified by dotted and wavy lines as FIGS. 11, 12, and 13. The thermodynamic methods used in the simulations are as follows in Table A:

TABLE A

| K-Value: | APISOAVE | Enthalpy: | APISOAVE | Density: STD | |
|---|---|---|---|---|---|
| Liquid 1 Visc: | NBS81 | Liquid 1 ThC: | NBS81 | Liquid 1 Den: STD | Surface Tension: HADDEN |
| Liquid 2 Visc: | STEAM | Liquid 2 ThC: | STEAM | Liquid 2 Den: STD | Surface Tension: STEAM |

Various simulation inputs, assumptions, and results can be seen in the following Tables B through F.

TABLE B

| | Flowrates | | | | | |
|---|---|---|---|---|---|---|
| Component Name | Total lbmol/hr | Incipient Vapor mol fra | Liquid 1 lbmol/hr | Liquid 2 lbmol/hr | Total mole % | K-Value |
| 48: CARBON MONOXIDE | 0 | 0 | 0 | 0 | 0 | 497.314 |
| 1: HYDROGEN | 0 | 0 | 0 | 0 | 0 | 198.932 |
| 62: WATER | 0 | 0 | 0 | 0 | 0 | 1.06274 |
| 49: CARBON DIOXIDE | 0 | 0 | 0 | 0 | 0 | 163.37 |
| 65: ACETYLENE | 0 | 0 | 0 | 0 | 0 | 108.63 |
| 40: BENZENE | 0 | 0 | 0 | 0 | 0 | 1.46198 |
| 22: ETHYLENE | 0 | 0 | 0 | 0 | 0 | 112.732 |
| 2: METHANE | 0 | 0 | 0 | 0 | 0 | 307.179 |
| 3: ETHANE | 0 | 0 | 0 | 0 | 0 | 79.1482 |
| 4: PROPANE | 0 | 0 | 0 | 0 | 0 | 27.5122 |
| 6: N-BUTANE | 0 | 0 | 0 | 0 | 0 | 10.1972 |
| 8: N-PENTANE | 0.173323 | 0.261321 | 0.173323 | 0 | 7.09909 | 3.68104 |
| 10: N-HEXANE | 0.173483 | 0.130238 | 0.173483 | 0 | 7.10563 | 1.83288 |
| 11: N-HEPTANE | 0.173114 | 0.066058 | 0.173114 | 0 | 7.09051 | 0.931641 |
| 12: N-OCTANE | 0.172974 | 0.033167 | 0.172974 | 0 | 7.08478 | 0.468143 |
| 13: N-NONANE | 0.172763 | 0.017081 | 0.172763 | 0 | 7.07614 | 0.241389 |
| 14: N-DECANE | 0.172554 | 0.008744 | 0.172554 | 0 | 7.0676 | 0.123716 |
| 15: N-UNDECANE | 0.172346 | 0.004707 | 0.172346 | 0 | 7.05906 | 0.066677 |
| 16: N-DODECANE | 0.172135 | 0.002515 | 0.172135 | 0 | 7.05045 | 0.035669 |
| 17: N-TRIDECANE | 0.171684 | 0.00135 | 0.171684 | 0 | 7.03198 | 0.019203 |
| 18: N-TETRADECANE | 0.171769 | 0.000696 | 0.171769 | 0 | 7.03542 | 0.009886 |
| 19: N-PENTADECANE | 0.171234 | 0.000381 | 0.171234 | 0 | 7.01352 | 0.005437 |
| 20: N-HEXADECANE | 0.18253 | 0.000219 | 0.18253 | 0 | 7.47621 | 0.002923 |
| 21: N-HEPTADECANE | 0.012029 | 9.151E−06 | 0.012029 | 0 | 0.492695 | 0.001857 |
| 91: N-OCTADECANE | 0.0000491 | 2.035E−08 | 0.0000491 | 0 | 0.002011 | 0.001012 |
| 92: N-NONADECANE | 5.241E−07 | 1.39E−10 | 5.241E−07 | 0 | 2.147E−05 | 0.000648 |
| 93: N-EICOSANE | 1.554E−08 | 2.08E−12 | 1.554E−08 | 0 | 6.364E−07 | 0.000327 |
| 3208: N-NONACOSANE | 0 | 0 | 0 | 0 | 4.025E−20 | 1.092E−06 |
| 2051: ISOBUTYL FORMATE | 0 | 0 | 0 | 0 | 0 | 0.954131 |
| 1245: SODIUM CHLORIDE | 0 | 0 | 0 | 0 | 0 | |
| 46: NITROGEN | 1.442E−17 | 1.263E−15 | 1.442E−17 | 0 | 5.905E−16 | 213.816 |
| 47: OXYGEN | 0 | 0 | 0 | 0 | 0 | 562.113 |
| 1021: METHANOL | 0.241399 | 0.429368 | 0.241399 | 0 | 9.88739 | 4.34259 |
| 2038: ISOBUTYL ALCOHOL | 0.108097 | 0.044147 | 0.108097 | 0 | 4.4275 | 0.997104 |
| 200: Biosolids | 0 | 0 | 0 | 0 | 0 | 2.645E−05 |
| Total | 2.44148 | 1 | 2.44148 | 0 | 100 | |

TABLE C

| | | Flowrates | | | |
|---|---|---|---|---|---|
| Component Name | Total lb/hr | Incipient Vapor mass fra | Liquid 1 lb/hr | Liquid 2 lb/hr | Total mass % |
| 48: CARBON MONOXIDE | 0 | 0 | 0 | 0 | 0 |
| 1: HYDROGEN | 0 | 0 | 0 | 0 | 0 |
| 62: WATER | 0 | 0 | 0 | 0 | 0 |
| 49: CARBON DIOXIDE | 0 | 0 | 0 | 0 | 0 |
| 65: ACETYLENE | 0 | 0 | 0 | 0 | 0 |
| 40: BENZENE | 0 | 0 | 0 | 0 | 0 |
| 22: ETHYLENE | 0 | 0 | 0 | 0 | 0 |
| 2: METHANE | 0 | 0 | 0 | 0 | 0 |
| 3: ETHANE | 0 | 0 | 0 | 0 | 0 |
| 4: PROPANE | 0 | 0 | 0 | 0 | 0 |
| 6: N-BUTANE | 0 | 0 | 0 | 0 | 0 |
| 8: N-PENTANE | 12.5046 | 0.301 | 12.5046 | 0 | 3.79384 |
| 10: N-HEXANE | 14.9493 | 0.1792 | 14.9493 | 0 | 4.53557 |
| 11: N-HEPTANE | 17.3456 | 0.10568 | 17.3456 | 0 | 5.26259 |
| 12: N-OCTANE | 19.7577 | 0.06049 | 19.7577 | 0 | 5.99441 |
| 13: N-NONANE | 22.1568 | 0.03498 | 22.1568 | 0 | 6.72228 |
| 14: N-DECANE | 24.5503 | 0.01986 | 24.5503 | 0 | 7.44846 |
| 15: N-UNDECANE | 26.938 | 0.011746 | 26.938 | 0 | 8.17287 |
| 16: N-DODECANE | 29.3195 | 0.006839 | 29.3195 | 0 | 8.89541 |
| 17: N-TRIDECANE | 31.6507 | 0.003975 | 31.6507 | 0 | 9.6027 |
| 18: N-TETRADECANE | 34.0755 | 0.002203 | 34.0755 | 0 | 10.3384 |
| 19: N-PENTADECANE | 36.3711 | 0.001293 | 36.3711 | 0 | 11.0348 |
| 20: N-HEXADECANE | 41.3307 | 0.00079 | 41.3307 | 0 | 12.5396 |
| 21: N-HEPTADECANE | 2.89248 | 0.000035 | 2.89248 | 0 | 0.877567 |
| 91: N-OCTADECANE | 0.012495 | 8.27E−08 | 0.012495 | 0 | 0.003791 |
| 92: N-NONADECANE | 0.000141 | 5.959E−10 | 0.000141 | 0 | 0.0000427 |
| 93: N-EICOSANE | 4.39E−06 | 9.381E−12 | 4.39E−06 | 0 | 1.332E−06 |
| 3208: N-NONACOSANE | 4.017E−19 | 0 | 4.017E−19 | 0 | 1.219E−19 |
| 2051: ISOBUTYL FORMATE | 0 | 0 | 0 | 0 | 0 |
| 1245: SODIUM CHLORIDE | 0 | 0 | 0 | 0 | 0 |
| 46: NITROGEN | 4.038E−16 | 5.647E−16 | 4.038E−16 | 0 | 1.225E−16 |
| 47: OXYGEN | 0 | 0 | 0 | 0 | 0 |
| 1021: METHANOL | 7.7349 | 0.2197 | 7.7349 | 0 | 2.34674 |
| 2038: ISOBUTYL ALCOHOL | 8.01245 | 0.05225 | 8.01245 | 0 | 2.43094 |
| 200: Biosolids | 0 | 0 | 0 | 0 | 0 |
| Total | 329.602 | 1 | 329.602 | 0 | 100 |

TABLE D

| | | Flowrates | | | |
|---|---|---|---|---|---|
| Component Name | Total ft3/hr | Vapor ft3/hr | Liquid 1 ft3/hr | Liquid 2 ft3/hr | Total volume % |
| 48: CARBON MONOXIDE | 0 | 0 | 0 | 0 | 0 |
| 1: HYDROGEN | 0 | 0 | 0 | 0 | 0 |
| 62: WATER | 0 | 0 | 0 | 0 | 0 |
| 49: CARBON DIOXIDE | 0 | 0 | 0 | 0 | 0 |
| 65: ACETYLENE | 0 | 0 | 0 | 0 | 0 |
| 40: BENZENE | 0 | 0 | 0 | 0 | 0 |
| 22: ETHYLENE | 0 | 0 | 0 | 0 | 0 |
| 2: METHANE | 0 | 0 | 0 | 0 | 0 |
| 3: ETHANE | 0 | 0 | 0 | 0 | 0 |
| 4: PROPANE | 0 | 0 | 0 | 0 | 0 |
| 6: N-BUTANE | 0 | 0 | 0 | 0 | 0 |
| 8: N-PENTANE | 0.506225 | 0 | 0.506225 | 0 | 7.09909 |
| 10: N-HEXANE | 0.506691 | 0 | 0.506691 | 0 | 7.10563 |
| 11: N-HEPTANE | 0.505613 | 0 | 0.505613 | 0 | 7.09051 |
| 12: N-OCTANE | 0.505204 | 0 | 0.505204 | 0 | 7.08478 |
| 13: N-NONANE | 0.504588 | 0 | 0.504588 | 0 | 7.07614 |
| 14: N-DECANE | 0.503979 | 0 | 0.503979 | 0 | 7.0676 |
| 15: N-UNDECANE | 0.50337 | 0 | 0.50337 | 0 | 7.05906 |
| 16: N-DODECANE | 0.502756 | 0 | 0.502756 | 0 | 7.05045 |
| 17: N-TRIDECANE | 0.501439 | 0 | 0.501439 | 0 | 7.03198 |
| 18: N-TETRADECANE | 0.501685 | 0 | 0.501685 | 0 | 7.03542 |
| 19: N-PENTADECANE | 0.500123 | 0 | 0.500123 | 0 | 7.01352 |

TABLE D-continued

| | Flowrates | | | | |
|---|---|---|---|---|---|
| Component Name | Total ft3/hr | Vapor ft3/hr | Liquid 1 ft3/hr | Liquid 2 ft3/hr | Total volume % |
| 20: N-HEXADECANE | 0.533117 | 0 | 0.533117 | 0 | 7.47621 |
| 21: N-HEPTADECANE | 0.035133 | 0 | 0.035133 | 0 | 0.492695 |
| 91: N-OCTADECANE | 0.000143 | 0 | 0.000143 | 0 | 0.002011 |
| 92: N-NONADECANE | 1.531E−06 | 0 | 1.531E−06 | 0 | 2.147E−05 |
| 93: N-EICOSANE | 4.538E−08 | 0 | 4.538E−08 | 0 | 6.364E−07 |
| 3208: N-NONACOSANE | 0 | 0 | 0 | 0 | 4.025E−20 |
| 2051: ISOBUTYL FORMATE | 0 | 0 | 0 | 0 | 0 |
| 1245: SODIUM CHLORIDE | 0 | 0 | 0 | 0 | 0 |
| 46: NITROGEN | 4.211E−17 | 0 | 4.211E−17 | 0 | 5.905E−16 |
| 47: OXYGEN | 0 | 0 | 0 | 0 | 0 |
| 1021: METHANOL | 0.705054 | 0 | 0.705054 | 0 | 9.88739 |
| 2038: ISOBUTYL ALCOHOL | 0.315718 | 0 | 0.315718 | 0 | 4.4275 |
| 200: Biosolids | 0 | 0 | 0 | 0 | 0 |
| Total | 7.13084 | 0 | 7.13084 | 0 | 100 |

TABLE E

| | Flowrates | | | | |
|---|---|---|---|---|---|
| Component Name | Total SCF/hr | Vapor SCF/hr | Liquid 1 SCF/hr | Liquid 2 SCF/hr | Total std vol % |
| 48: CARBON MONOXIDE | 0 | 0 | 0 | 0 | 0 |
| 1: HYDROGEN | 0 | 0 | 0 | 0 | 0 |
| 62: WATER | 0 | 0 | 0 | 0 | 0 |
| 49: CARBON DIOXIDE | 0 | 0 | 0 | 0 | 0 |
| 65: ACETYLENE | 0 | 0 | 0 | 0 | 0 |
| 40: BENZENE | 0 | 0 | 0 | 0 | 0 |
| 22: ETHYLENE | 0 | 0 | 0 | 0 | 0 |
| 2: METHANE | 0 | 0 | 0 | 0 | 0 |
| 3: ETHANE | 0 | 0 | 0 | 0 | 0 |
| 4: PROPANE | 0 | 0 | 0 | 0 | 0 |
| 6: N-BUTANE | 0 | 0 | 0 | 0 | 0 |
| 8: N-PENTANE | 0.317706 | 0 | 0.317706 | 0 | 4.46357 |
| 10: N-HEXANE | 0.360995 | 0 | 0.360995 | 0 | 5.07175 |
| 11: N-HEPTANE | 0.40415 | 0 | 0.40415 | 0 | 5.67805 |
| 12: N-OCTANE | 0.448128 | 0 | 0.448128 | 0 | 6.2959 |
| 13: N-NONANE | 0.492178 | 0 | 0.492178 | 0 | 6.91478 |
| 14: N-DECANE | 0.536288 | 0 | 0.536288 | 0 | 7.5345 |
| 15: N-UNDECANE | 0.58059 | 0 | 0.58059 | 0 | 8.15691 |
| 16: N-DODECANE | 0.623602 | 0 | 0.623602 | 0 | 8.76121 |
| 17: N-TRIDECANE | 0.665575 | 0 | 0.665575 | 0 | 9.35091 |
| 18: N-TETRADECANE | 0.711826 | 0 | 0.711826 | 0 | 10.0007 |
| 19: N-PENTADECANE | 0.753102 | 0 | 0.753102 | 0 | 10.5806 |
| 20: N-HEXADECANE | 0.849147 | 0 | 0.849147 | 0 | 11.93 |
| 21: N-HEPTADECANE | 0.059015 | 0 | 0.059015 | 0 | 0.829129 |
| 91: N-OCTADECANE | 0.000256 | 0 | 0.000256 | 0 | 0.003595 |
| 92: N-NONADECANE | 2.875E−06 | 0 | 2.875E−06 | 0 | 4.039E−05 |
| 93: N-EICOSANE | 8.915E−08 | 0 | 8.915E−08 | 0 | 1.253E−06 |
| 3208: N-NONACOSANE | 0 | 0 | 0 | 0 | 1.12E−19 |
| 2051: ISOBUTYL FORMATE | 0 | 0 | 0 | 0 | 0 |
| 1245: SODIUM CHLORIDE | 0 | 0 | 0 | 0 | 0 |
| 46: NITROGEN | 8.025E−18 | 0 | 8.025E−18 | 0 | 1.127E−16 |
| 47: OXYGEN | 0 | 0 | 0 | 0 | 0 |
| 1021: METHANOL | 0.15516 | 0 | 0.15516 | 0 | 2.1799 |
| 2038: ISOBUTYL ALCOHOL | 0.160043 | 0 | 0.160043 | 0 | 2.2485 |
| 200: Biosolids | 0 | 0 | 0 | 0 | 0 |
| Total | 7.11776 | 0 | 7.11776 | 0 | 100 |

TABLE F

| Properties | | | |
|---|---|---|---|
| Temperature | F. | 65° | |
| Pressure | psia | 38 | |
| Enthalpy | Btu/hr | −49154.95 | |
| Entropy | Btu/hr/R | −48.94892 | |
| Vapor Fraction | | 0 | |
| | | Total | Liquid 1 |
| Flowrate | lbmol/hr | 2.4415 | 2.4415 |
| Flowrate | lb/hr | 329.6023 | 329.6023 |
| Mole Fraction | | 1 | 1 |
| Mass Fraction | | 1 | 1 |
| Molecular Weight | | 135.0009 | 135.0009 |
| Enthalpy | Btu/lbmol | −20133.243 | −20133.243 |
| Enthalpy | Btu/lb | −149.1341 | −149.1341 |
| Entropy | Btu/Ibmol/R | −20.0489 | −20.0489 |
| Entropy | Btu/lb/R | −0.148509 | −0.148509 |
| Cp | Btu/lbmol/R | | 70.4007 |
| Cp | Btu/lb/R | | 0.5215 |
| Cv | Btu/lbmol/R | | 62.859 |
| Cv | Btu/lb/R | | 0.4656 |
| Cp/Cv | | | 1.12 |
| Density | lb/ft3 | | 46.2221 |
| Z-Factor | | | 0.019714 |
| Flowrate (T-P) | gal/min | | 0.889097 |
| Flowrate (STP) | gal/min | | 0.887409 |
| Specific Gravity | GPA STP | | 0.742497 |
| Viscosity | cP | | 0.630051 |
| Thermal Conductivity | Btu/hr/ft/R | | 0.069657 |
| Surface Tension | dyne/cm | | 23.2852 |
| Critical Temperature (Cubic EOS) | F. | 689.9811° | |
| Critical Pressure (Cubic EOS) | psia | 446.2985 | |
| Dew Point Temperature | F. | 500.9092° | |
| Bubble Point Temperature | F. | −405.4502° | |
| Water Dew Point Temperature could not be calculated | | | |
| Stream Vapor Pressure | psia | 1.319 | |
| Latent Heat of Vaporization (No Sensible Heat) | Btu/lb | 115.7845 | |
| Latent Heat of Vaporization (Plus Sensible Heat) | Btu/lb | 381.5861 | |
| CO2 Freeze Up | | No | |
| Heating Value (gross) | Btu/SCF | 2497.73 | |
| Heating Value (net) | Btu/SCF | 2391.69 | |
| Wobbe Number | Btu/SCF | 1060.98 | |
| Average Hydrogen Atoms | | 20.636 | |
| Average Carbon Atoms | | 9.318 | |
| Hydrogen to Carbon Ratio | | 2.2146 | |

Various aspects of different embodiments of the present invention are expressed in paragraphs X1, X2, X3, and X4 as follows:

X1. One aspect of the present invention pertains to a method for converting synthesis gas into Fischer-Tropsch products. One aspect of the present invention pertains to a method for providing a reactor vessel having a length with a plurality of tubular heat exchanging assemblies, each heat exchanging assembly having a length, the vessel and the heat exchanging assemblies being lengthwise parallel to each other. One aspect of the present invention pertains to a method for flowing synthesis gas in one direction into the vessel, and catalytically converting the flowing synthesis gas into Fischer-Tropsch products and heat. One aspect of the present invention pertains to a method for removing the heat by flowing a heat transfer media in the opposite direction in each tubular heat exchanging assembly.

X2. Another aspect of the present invention pertains to a heat transfer assembly. The assembly includes an outer tube having an opened end and a closed end, the outer diameter of said outer tube being at least partially coated in a catalyst. One aspect of the present invention pertains to the assembly including a second inner tube located at least in part in the interior of said outer tube and having two opened ends, a first opened end being located proximate the closed end of said outer tube, the second opened end being located proximate the opened end of said outer tube. One aspect of the present invention pertains to an assembly wherein said outer and inner tubes coact to provide a flowpath for a heat transferring media that extends from the opened end of said outer tube to the first end of inner tube and then to the second end of said inner tube.

X3. Yet another aspect of the present invention pertains to an apparatus for calcination of organic material. One aspect of the present invention pertains to an apparatus including a kiln rotatable about an axis, the interior of said kiln including an array of teeth arranged in a row that extends in a spiral shape relative to the axis, one end of said kiln including a hinged door having a waste removal aperture. One aspect of the present invention pertains to an apparatus including an electric heater placed within the interior of said kiln; wherein said array of teeth are adapted and configured such that rotation of said kiln about the axis in one direction provides a cutting action of said array of teeth on the organic material, and rotation of said kiln in the opposite direction provides by said array of teeth the movement of material within said kiln toward said door.

X4. Still another aspect of the present invention pertains to a method for oxidation-reduction of organic material. One aspect of the present invention pertains to a method for providing a rotary kiln having an internal spiral member, a door and an internal electric heater. One aspect of the present invention pertains to a method for breaking apart any organic material within the enclosed kiln by rotating said kiln in a first direction. One aspect of the present invention pertains to a method for heating the material within the kiln with the electric heater. Another aspect of the present invention pertains to moving the waste material within the cooled kiln toward the door by rotating the kiln in the opposite direction. Still different embodiments of this method pertain to calcinating organic material, whereas other embodiments pertain to methods for burning organic material.

Yet other embodiments pertain to any of the previous statements X1, X2, X3, or X4, which are combined with one or more of the following other aspects. It is also understood that any of the aforementioned X paragraphs include listings of individual features that can be combined with individual features of other X paragraphs.

Which further comprises a process for producing synthesis gas using either of the designs expressed in paragraphs X1 or X2, combined with one of the designs expressed in paragraphs X3 or X4.

Which further comprises flowing the heat transfer media from the bottom end of each tubular heat exchanging assembly toward the top end in a second internal flowpath within each tubular heat exchanging assembly.

Which further comprises cooling the removed gaseous FT products by heating the media, and using the heated media during said flowing a heat transfer media.

Which further comprises adding heat to the heated media before said flowing a heat transfer media.

Wherein said providing includes a heat engine coupled to an electrical generator, which further comprises powering said engine with the removed heat.

Wherein said outer tube and said inner tube are substantially linear between respective ends.

Wherein the opened end of said outer tube is adapted and configured to support said heat transfer assembly from a flange.

Which further comprises a plurality of heat transferring fins each at least partially coated with the catalyst.

Wherein said fins are axial fins arranged generally parallel to the centerline of each said tube.

Wherein said fin is arranged to form a substantially unobstructed drip path for the movement of liquid FT products along said fin and toward the closed end.

Wherein said fin has a spiral shape along the length of said outer tube.

Wherein said fin and the outer diameter of said outer tube coact to create a channel for the downward flow of FT liquids.

Which further comprises a first fluid manifold in fluid communication with the opened end of said outer tube and a second fluid manifold in fluid communication with the second opened end of said inner tube.

Which further comprises a plurality of parallel, spaced-apart said heat transfer assemblies each supported at the opened end of the outer tube by a flange and each adapted and configured both to be repeatedly removed separately from said flange and to be repeatedly installed separately to said flange.

Wherein the opened end of each said outer tube are in fluid communication with one another and the second end of each said inner tube are in fluid communication with one another.

Wherein said kiln is tapered about a length along the axis, and one end is smaller than the other end.

Wherein said door is a first hinged door, and which further comprises a second hinged door located at the one end, said second door being adapted and configured to seal an opening of said kiln during high temperature operation.

Wherein each said tooth has at least one of a sawtooth or triangular overall shape.

Wherein said teeth are arranged side-by-side, with the bottom of adjacent teeth forming a spiral-shaped passageway for movement of waste material falling against the teeth during rotation of the kiln.

Wherein each said tooth is non-perpendicular to the inner wall of the kiln.

Wherein the row of teeth are arranged to lean in a direction adapted and configured to impale the rotating organic material.

Wherein said kiln has a rotating outer surface, which further comprises at least one heating element located to heat said kiln through the outer surface.

Which further comprises a scoop adapted and configured to receive material from the kiln during rotation in the opposite direction and provide the material to said aperture.

Which further comprises a ceramic filtering element placed around the exterior of said heater;

Which further comprises cooling the kiln after said synthesizing and before said removing.

Wherein the door includes hopper and said rotating in the opposite directions places the waste material into the hopper.

Wherein the internal spiral member includes a plurality of teeth, and said breaking apart is by the teeth.

Wherein said rotating in a first direction moves the organic material away from the door.

Which further comprises injecting steam into said kiln during said heating.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A heat transfer assembly for a Fischer-Tropsch reactor, comprising:
    an outer tube having an opened end and a closed end, the outer diameter of said outer tube including at least one heat transferring fin, the fin being at least partially coated in a catalyst useful to produce Fischer-Tropsch products from synthesis gas in a reactor;
    a second inner tube located at least in part in the interior of said outer tube and having two opened ends, a first opened end being located proximate the closed end of said outer tube, the second opened end being located proximate the opened end of said outer tube;
    wherein said outer and inner tubes coact to provide a flowpath for a heat transferring media that extends from the opened end of said outer tube to the first end of inner tube and then to the second end of said inner tube.

2. The assembly of claim 1 wherein said outer tube and said inner tube are substantially linear between respective ends.

3. The assembly of claim 1 wherein the opened end of said outer tube is adapted and configured to support said heat transfer assembly from a flange.

4. The assembly of claim 1 which further comprises a plurality of heat transferring fins each at least partially coated with the catalyst.

5. The assembly of claim 4 wherein said fins are axial fins arranged generally parallel to the centerline of each said tube.

6. The assembly of claim 1 wherein said fin is arranged to form a substantially unobstructed drip path for the movement of liquid FT products along said fin and toward the closed end.

7. The assembly of claim 6 wherein said fin has a spiral shape along the length of said outer tube.

8. The assembly of claim 1 wherein said fin and the outer diameter of said outer tube coact to create a channel for the downward flow of FT liquids.

9. The assembly of claim 1 which further comprises a first fluid manifold in fluid communication with the opened end of said outer tube and a second fluid manifold in fluid communication with the second opened end of said inner tube.

10. The assembly of claim 1 which further comprises a plurality of parallel, spaced-apart said heat transfer assemblies each supported at the opened end of the outer tube by a flange and each adapted and configured both to be repeatedly removed separately from said flange and to be repeatedly installed separately to said flange.

11. The assembly of claim 10 wherein the opened end of each said outer tube are in fluid communication with one another and the second end of each said inner tube are in fluid communication with one another.

* * * * *